United States Patent [19]

Hishida et al.

[11] Patent Number: 5,303,230
[45] Date of Patent: Apr. 12, 1994

[54] FAULT TOLERANT COMMUNICATION CONTROL PROCESSOR

[75] Inventors: Tatsuo Hishida; Yoshimasa Suetsugu; Toshiki Nakajima, all of Kawasaki, Japan

[73] Assignee: Fujitsu Limited, Kawasaki, Japan

[21] Appl. No.: 846,903

[22] Filed: Mar. 6, 1992

[30] Foreign Application Priority Data

| Mar. 6, 1991 [JP] | Japan | 3-040140 |
| Aug. 21, 1991 [JP] | Japan | 3-209000 |
| Nov. 28, 1991 [JP] | Japan | 3-314165 |

[51] Int. Cl.$^5$ .................. H04J 3/16; H04Q 3/545; H04Q 11/04
[52] U.S. Cl. .................. 370/58.1; 370/58.2; 370/68; 370/85.6; 370/85.7
[58] Field of Search .......... 370/13, 14, 16, 58.1, 370/58.2, 58.3, 66, 68, 68.1, 85.1, 85.2, 85.6, 85.7, 110.1, 55, 79, 80; 340/825.01, 825.03, 826, 827, 825.16, 825.17, 825.06, 825.5, 825.51; 371/8.1, 8.2, 9.1, 11.1, 11.2, 11.3, 16.1, 19, 20.1; 379/268, 269, 271, 272, 273, 279

[56] References Cited

U.S. PATENT DOCUMENTS

| 4,228,536 | 10/1980 | Gueldenpfennig et al. | 370/58.2 |
| 4,232,386 | 11/1980 | McDonald et al. | 370/68 |
| 4,520,477 | 5/1985 | Wen | 370/58.3 |
| 4,621,357 | 11/1986 | Naiman et al. | 370/58.2 |
| 4,700,340 | 10/1987 | Beranek et al. | 370/16 |
| 4,730,304 | 3/1988 | Mezera et al. | 370/58.2 |
| 5,012,465 | 4/1991 | Helou et al. | 370/58.1 |

OTHER PUBLICATIONS

K. Neufang, "Das DigitalKoppalnetz im System EWSD", *Telecom Report–Digitalvermittlungssystem EWSD*, No. 4, 1981, pp. 28–32.

*Primary Examiner*—Douglas W. Olms
*Assistant Examiner*—Alpus H. Hsu
*Attorney, Agent, or Firm*—Staas & Halsey

[57] ABSTRACT

A fault tolerant communication control processor in a time division multiplex communication system is set up with microprocessor units executing communication control programs, line control units processing the transferred data for transmission or reception by channel and time slot control units for assigning the channel addresses to time slots. The time slot control units are operative to control the information of correspondence between channel addresses and time slots. When any one of the time slot control units receives new instructions for channel assignment from a microprocessor unit, it is operative to execute exclusive control by informing the other time slot control units not to use the newly instructed channel.

19 Claims, 21 Drawing Sheets

Fig. 15

| TS NUMBER | E | EO | CH ADDRESS |
|---|---|---|---|
| 1 | 0 | 1 | 10 |
| 2 | 1 | 1 | 13 |
| ⋮ | ⋮ | ⋮ | ⋮ |
| n-1 | 1 | 1 | 5 |
| n | 0 | 0 | 0 |

| TS NUMBER | E | CHANNEL |
|---|---|---|
| 1 | 1 | 1 |
| 2 | 1 | 3 |
| 3 | 0 | 4 |
| ⋮ | ⋮ | ⋮ |
| n | 1 | i |

Fig. 23

| TS NUMBER | E | CHANNEL |
|---|---|---|
| 1 | 1 | 1 |
| 2 | 1 | 1 |
| 3 | 0 | 4 |
| ⋮ | ⋮ | ⋮ |
| n | 1 | i |

FAULT TOLERANT COMMUNICATION CONTROL PROCESSOR

BACKGROUND OF THE INVENTION

1. Filed of the Invention

The present invention relates to a fault tolerant communication control processor, which ensures high reliability in processing the transferred data as a whole system, even though a fault has occurred, in a time division multiplex data communication system.

In recent years, it has been necessary for relatively large amounts of data to be transferred with high speed and simultaneously with high reliability, because of the increase of computer networks. To meet the speed requirements the multiplex data communication system, such as an integrated service digital network (ISDN), is generally utilized. On the other hand, to meet the reliability requirement, a fault tolerant communication control processor that has a multiplexed and redundant circuit configuration, is generally utilized.

2. Description of the Related Art

In a computer network using a time division multiplex data communication system, in the prior art, a communication control processor (CCP) comprises a stand-by communication control unit (CCU) that is usually idle, and well as a normal communication control unit (CCU), which is currently used: namely, the duplexed and redundant configuration having normal CCU and stand-by CCU is adopted. In this configuration, even when the normal CCU has failed during transmission or the reception of data, the stand-by CCU may be selected and operated immediately, and therefore high reliability in the whole system may be maintained.

The above prior art will be explained more specifically. In this data communication system, it is assumed that a large amount of data are transferred and processed by the frame unit. Further, one frame is divided into a plurality of time slots of numbers n (n denotes natural number) and each time slot (TS) contains the data for one line, which is called a channel.

Therefore, in transmission side, the data for N channels are transmitted by dividing and multiplexing these data. In the reception side, these data are stored in the predetermined location by isolating the multiplexed time slots of every channel. If each frame data is transferred repeatedly with the required times, all the data can be transferred by the unit of each channel. Namely, all the data can be constructed by collecting the data isolated in the reception side of every channel.

A sequence of these operations are controlled by a normal CCU, which is assigned previously by the host computer. Further, a stand-by CCU is designed to have the same data as the normal CCP during the above operations, in order to be ready to start at any time. If some fault has occurred in at least one of the channels controlled by the normal CCU, all the channels are immediately switched, so that the controller of the channels may be transferred from the normal CCU to the stand-by CCU. Consequently, high reliability in the whole system including the normal CCU and stand-by CCU is ensured against accidental error.

In the prior art, however, there are the following problems.

First, even when the fault has occurred in only one channel, all channels, including the other normal channels, must also be switched. During the time for switching these channels, communication with the normal channels are stopped, which means that the faulty channel has a significant influence on the normal channels.

Second, when the normal CCU is normally operating, the stand-by CCU is idle. Therefore, the potential of a stand-by CCU in processing transferred data cannot be fully utilized, which leads to the deterioration of the efficiency of the data processing.

Third, since the stand-by CCU is not usually used, it is difficult to detect the fault existing in itself. Therefore, the above fault is not likely to be found until all channels are changed over from the normal CCU to the stand-by CCU, which leads to the deterioration of the reliability of the whole system.

SUMMARY OF THE INVENTION

Accordingly, an object of the present invention is to provide a fault tolerant communication control processor, that prevents the normal channels from being adversely affected by a faulty channel at the time of switching, and moreover enables a time division multiplex data communication system to be realized with greater data processing efficiency and higher reliability, compared with the prior art.

To attain the above object, the fault tolerant communication control processor (CCP) is constructed as follows:

First, microprocessor units (MPU) are set up that execute communication control programs for controlling the multiplex data communication system; line control units (LNC) are set up in which the transferred data from each microprocessor unit are processed for transmission or reception by the unit of each channel and have respectively corresponding channel addresses, and time slot control units (TSC) are set up in which the output data from each line control unit are assigned to at least one of the time slots. Further, each time slot control unit manages correspondence information between a channel address and a time slot. Further, when one of these time slot control units receive that instruction to adopt the new information, the above time slot control unit executes exclusive control by instructing the other time slot control units not to use the new information.

By virtue of the exclusive control in the time slot control units, it is possible for channels in different line control units to be utilized effectively and further it becomes unnecessary for normal channels to be switched even when a fault has occurred in some channels.

Further, in a preferred embodiment of the present invention, a communication control processor comprises a means for sending the exclusive control signals for executing the exclusive control.

In another preferred embodiment, a communication control processor further comprises interrupting circuits for executing the process for interrupting the exclusive control signals.

BRIEF DESCRIPTION OF THE DRAWINGS

The above object and features of the present invention will be more apparent from the following description of the preferred embodiments with reference to the accompanying drawings, wherein:

FIG. 15 is a diagram showing the content of a time slot table shown in FIG. 11;

FIG. 21 is an example of a time slot management table shown in FIG. 20;

DESCRIPTION OF THE PREFERRED EMBODIMENTS

Before describing the embodiments of the present invention, the related art and the disadvantage therein will be described with reference to the related figures.

Figure 1:
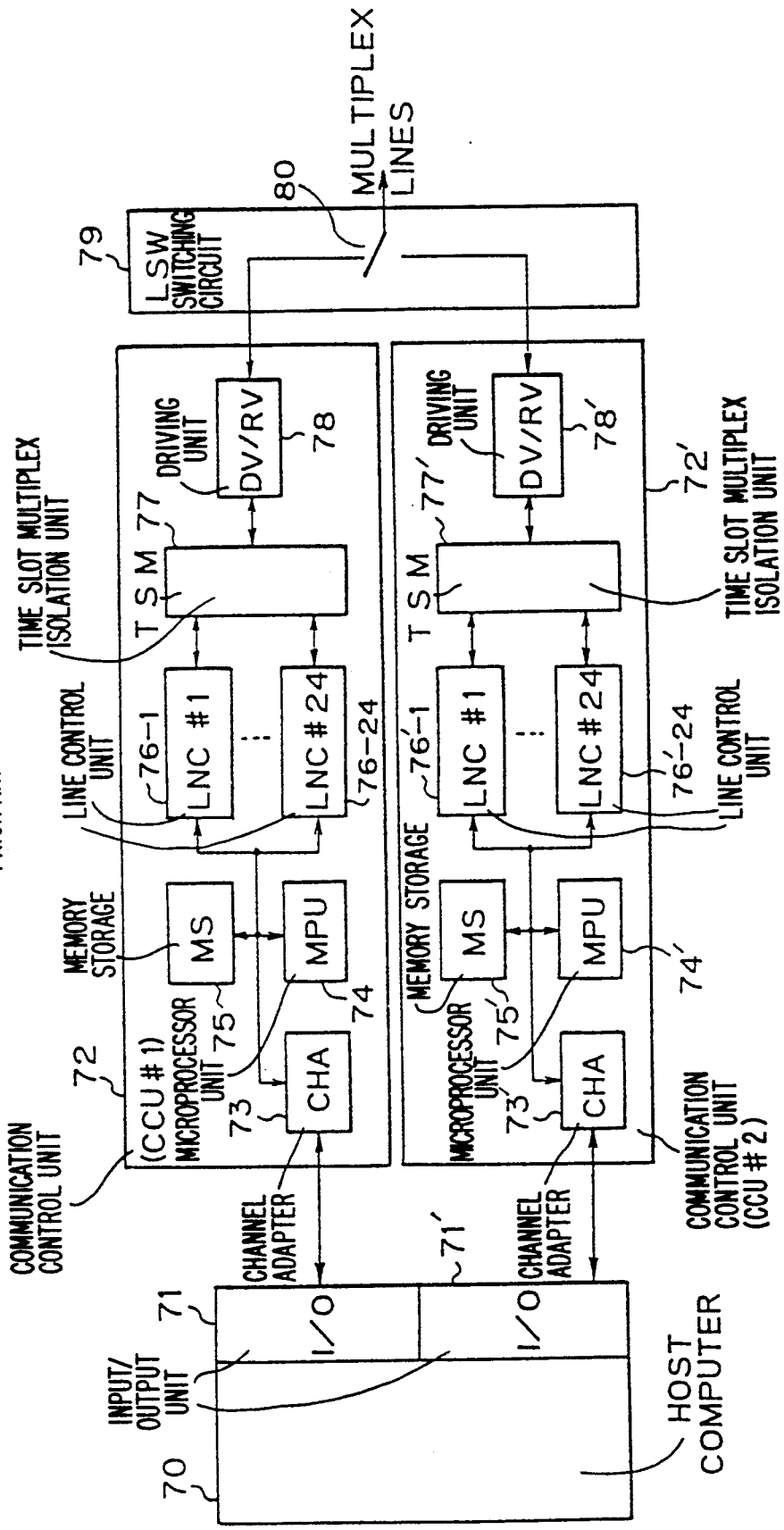
FIG. 1 is an block diagram showing a communication control processor in time division multiplex lines according to a prior art.

FIG. 1 is an block diagram showing a communication control processor in time division multiplex lines according to a prior art.

In FIG. 1, a time division multiplex data communication system using time division multiplex lines has a host computer 70, input-output unit (I/O) 71, 71' for transferring data and two communication control units 72, 72' (CCU#1, CCU#2). CCU#1 is usually used and is therefore called normal CCU. On the other hand, CCU#2 is usually idle but operative when CCU#1 has failed and therefore is called stand-by CCU.

Further, CCU#1 and CCU#2 include channel adapters (CHA) 73, 73' connected to a host computer 70, microprocessor units (MPU) 74, 74, and memory storage (MS) 75, 75', respectively.

In this case, twenty-four channels are provided and channel addresses from 1 through 24 are given for respectively corresponding channels. CCU#1 includes line control units (LNC) 76-1~76-24, which transform data of parallel bits for transmission into those of serial bits corresponding to the above channel, respectively. Further, CCU#2 includes line control units (LNC) 76'-1~76'-24, corresponding to the above channel, respectively.

CCU#1 and CCU#2 further include time slot multiplex isolation units (TSM) 77, 77' and driving units (DV/RV) 78, 78' of transmitted data and received data, respectively. Further, switching circuit (LSW) 79 of a line control unit is provided, by which all channels are switched to be controlled by CCU#2 when CCU#1 has failed. The above switching operation is actually executed by the transfer switch 80.

Figure 2:
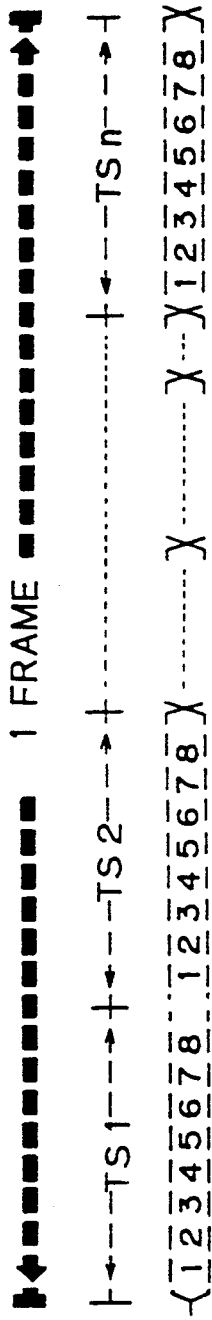
FIG. 2 is a time chart showing the construction of data for one frame.

FIG. 2 is a time chart showing the construction of data for one frame.

Figure 3:
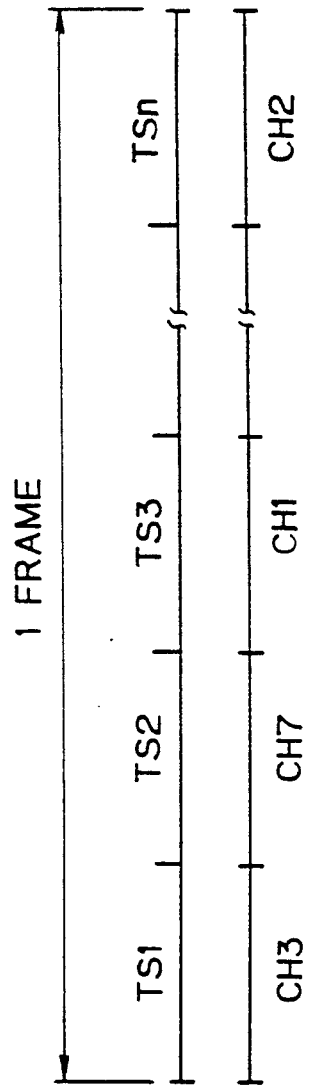
FIG. 3 is a time chart showing the relation between channels and time slots.

FIG. 3 is a time chart showing the relation between channels and time slots.

A time slot (TS) is defined as the minimum unit for transmission or reception of data, and each time slot contains data of eight bits. The data of one frame is constructed from a plurality of time slots of number n (TS1~TSn). In the above construction, the data for N channels at the maximum can be transferred via only one transmission line.

To transmit or receive the data, as typically shown in FIG. 3, CH3 is assigned to TS1, CH7 is assigned to TS2 and so forth. When the data of these channels are transmitted, the data is transferred to the transmission line in response to the timing of the corresponding time slot. On the other hand, when the data are received, the data is extracted from the transmission line for each channel in response to the timing of the corresponding time slot.

FIG. 1 will be referred to again, in order to explain a sequence of operations in FIG. 1 in more detail.

Usually, CCU#1 is used for a normal system, while CCU#2 is ready to start at any time as a stand-by system.

On reception, the data are received in a driving unit 78 and then isolated by the time slots in a time slot multiplex isolation unit 77 to separate into channels and then input to the corresponding line control units 76-1~76-24 to transform the input data of serial bits into those of parallel bits. Further, in accordance with communication control programs stored in a memory storage 75, the data of parallel bits are processed by a microprocessor unit 74 and then, via a channel adapter 73, sent to an input-output unit 71. The data from the unit 71 are finally processed in a host computer 70.

On transmission, on the other hand, the data of parallel bits are sent from an input-output unit 71 to a channel adapter 73 and then, in accordance with the communication control programs, the data are transformed into serial bits by the line control units 76-1~76-24 corresponding to the respective channel and then assigned to time slots corresponding to the respective channels, in a time slot multiplex isolation unit 77. Further, the data are driven in a driving unit 78 and then output to multiplex lines.

When a fault has occurred in some channels and CCU#1 has failed, CCU#2 is selected by the switching operation of a transfer switch and then operates similar to CCU#1.

According to the above prior art, even when the fault has occurred in only one channel in a normal CCU (CCU#1), all channels are switched at once to be controlled by a stand-by CCU (CCU#2). During the time for switching, communication with these channels stops for a time and therefore high speed data communication is interrupted. Further, a stand-by CCU is usually completely idle and therefore the capacity of a stand-by CCU for processing data cannot be fully utilized. Moreover, a fault in a stand-by CCU itself is difficult to be found until all channels are switched to a stand-by CCU.

Figure 4:
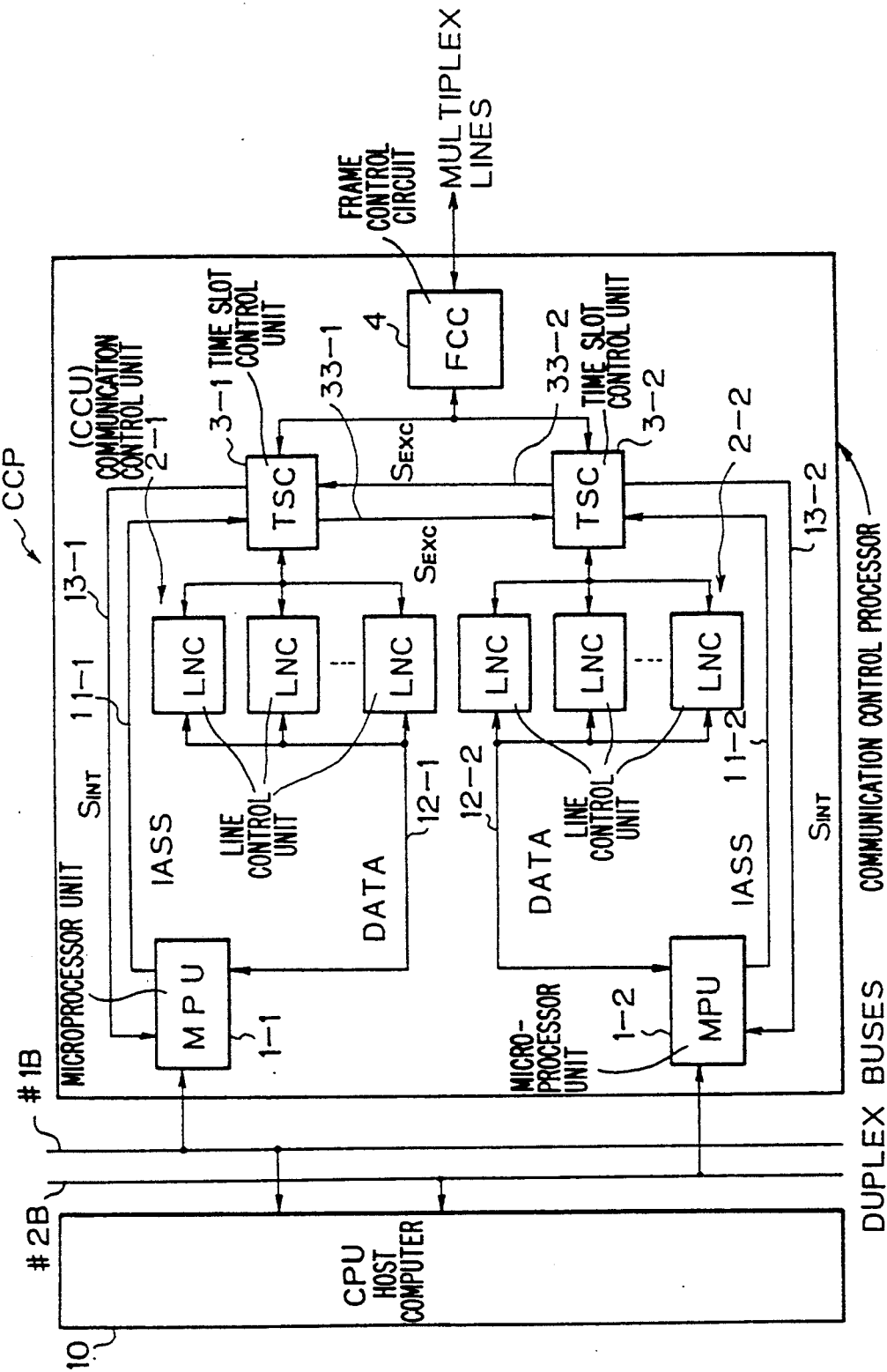
FIG. 4 is a block diagram showing a preferred embodiment of a communication control processor according to the present invention.

FIG. 4 is a block diagram showing a preferred embodiment of a communication control processor according to the present invention.

In this embodiment, two communication control units in a communication control processor (CCP) are combined into one unit. This communication control unit (CCU) is connected to multiplex buses #1B, #2B, both of which are connected to a central processing unit (CPU) 10. The CPU 10 is the host computer for controlling all the sequences in a time division multiplex data communication system. The above CCU comprises two microprocessor units (MPU) 1-1, 1-2 connected to multiplex buses #1B, #2B respectively for executing communication control programs, two sets of line control units (LNC) 2-1, 2-2 processing the transferred data for transmission or reception and two time slot control units (TSC) 3-1, 3-2 for establishing correspondence between channel addresses in the line control units 2-1, 2-2 and time slots.

Microprocessor units 1-1, 1-2 are connected to two sets of line control units 2-1, 2-2 each of which have channel addresses of number n, via data lines 12-1, 12-2, and further connected to time slot control units 3-1, 3-2, via control lines 11-1, 11-2, 13-1 and 13-2, respectively. The instructions of channel assignment (IASS) are sent from microprocessor units 1-1, 1-2 to the corresponding time slot control units 3-1, 3-2, via control lines 11-1, 11-2, respectively. The intercepting signals ($S_{INT}$) are sent from time slot control units 3-1, 3-2 to the corresponding microprocessor units 1-1, 1-2, via control line 13-1, 13-2, respectively. The above intercepting signals are used for notifying the corresponding microprocessor units 1-1, 1-2 of the channel address corresponding to the following channel: namely, the channel that has been assigned to the given time slot or has canceled the assignment or has changed the assignment during the operation, by means of the above mentioned instructions sent from microprocessor unit and the undermentioned exclusive control signals ($S_{EXC}$), described below, which are sent from the other time slot control unit.

The two time slot control units 3-1, 3-2 are connected to each other, via exclusive control lines 33-1, 33-2. In other words, via exclusive control line 33-1, the exclusive control signal is set from time slot control unit 3-1 to the other time slot control unit 3-2, and via exclusive control line 33-2, the exclusive control signal is sent from time slot control unit 3-2 to the other unit 3-1. The exclusive control signals are used for instructing the other time slot control unit not using the given time slot when the time slot control unit has received the instructions to assign the channel to the given time slot from the corresponding microprocessor; both time slot control units 3-1, 3-2 are connected to multiplex lines, via a frame control circuit (FCC) 4.

Figure 5:
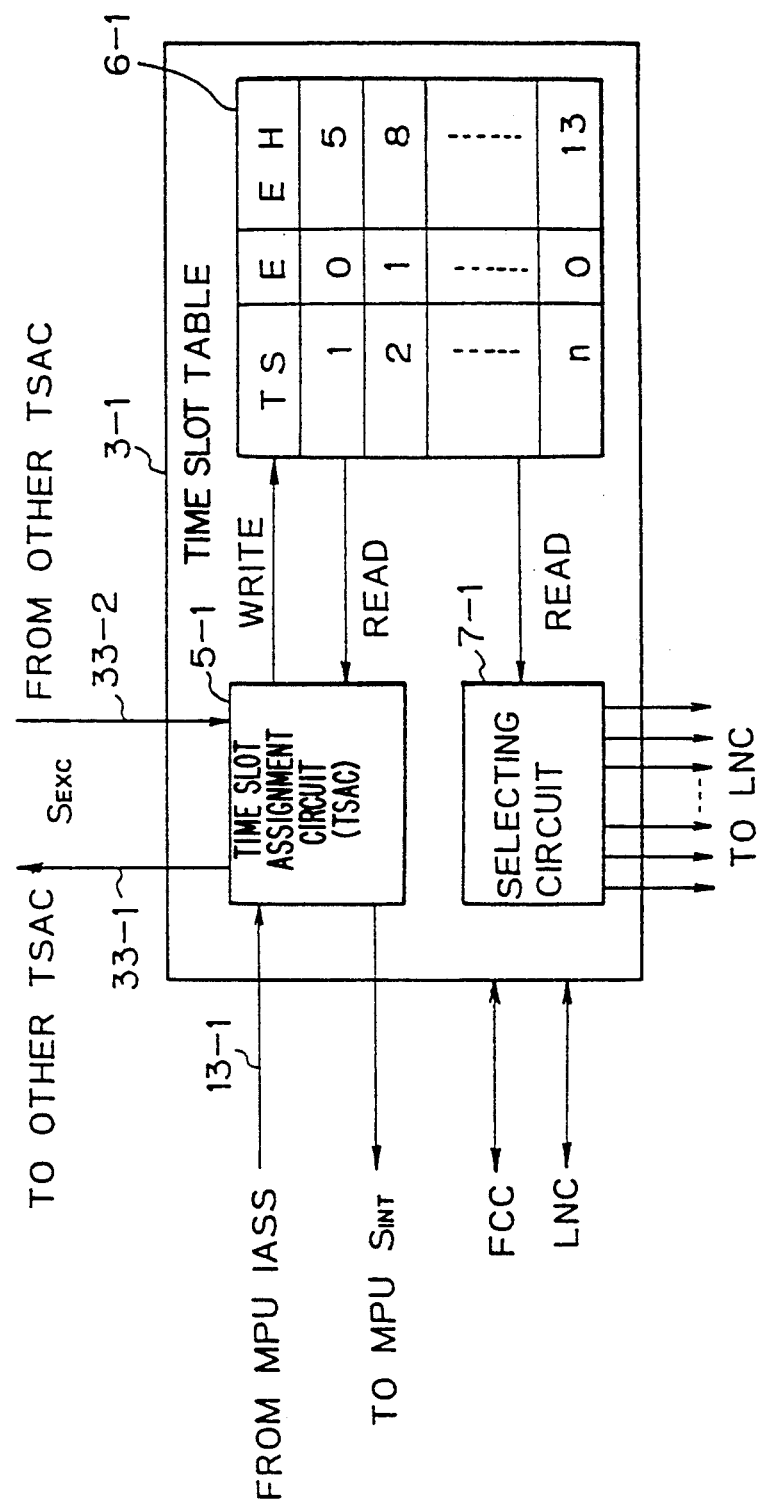
FIG. 5 is a detailed example of a time slot control unit shown in FIG. 4.

FIG. 5 is a detailed example of a time slot control unit shown in FIG. 4. From now on, any component that is the same as that mentioned before will be referred to using the same reference number.

In FIG. 5, only one time slot control unit 3-1 of the two units 3-1, 3-2 will be illustrated to simplify the explanation. In this example, time slot control units 3-1, 3-2 comprise time slot assignment circuits (TSAC) 5-1, 5-2, time slot tables (TS TABLE) 6-1, 6-2 and selecting circuits 7-1, 7-2.

Time slot assignment circuits 5-1, 5-2 are connected to microprocessor unit 1-1, 1-2, via control lines 11-1, 11-2, 13-1 and 13-2 and connected to each other via exclusive control lines 33-1, 33-2, respectively. Time slot assignment circuits 5-1, 5-2 are also connected to time slot tables 6-1, 6-2, respectively. Further, time slot tables 6-2, 6-2 are composed of memories that establish correspondence between E (enable) flags and channel addresses and store the information of the correspondence. Each E flag indicates whether or not each time slot is presently used. If E flag is "1", the time slot is used (enable), while, if it is "0", the time slot is not used (disable). The channel address corresponding to the channel assigned to each time slot is stored in the memories, together with the state of each E flag. Further, selecting circuits 7-1, 7-2 are connected to line control units 2-1, 2-2 and time slot table 6-1, 6-2, respectively. The above selecting circuits 7-1, 7-2 select the channels to use from line control units 2-1, 2-2, in accordance with the content of time slot tables 6-1, 6-2, respectively.

FIGS. 6, 7, 8, 9 and 10 represent a diagram explaining a sequence of operations of the time slot control units shown in FIG. 4 and 5. The switching operation of the time slot control units will be explained in detail with reference to FIGS. 6, 7, 8, 9 and 10.

Figure 6:
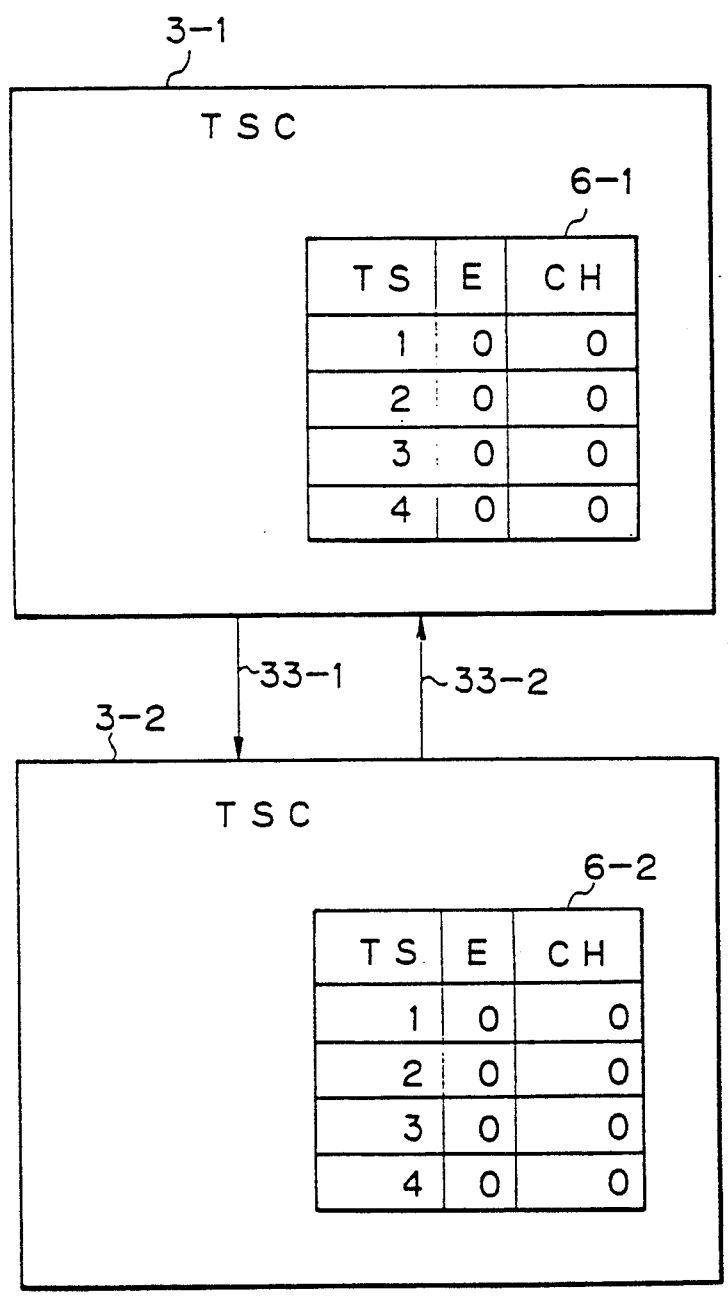
FIGS. 6, 7, 8, 9 and 10 is a diagram for explaining a sequence of operations of time slot control units shown in FIGS. 4 and 5.

FIG. 6 illustrates the content of each time slot table 6-1, 6-2 in the respectively corresponding time slot control units 3-1, 3-2, in an initial state. In this case, since every E flag is "0", time slot is not used.

Figure 7:
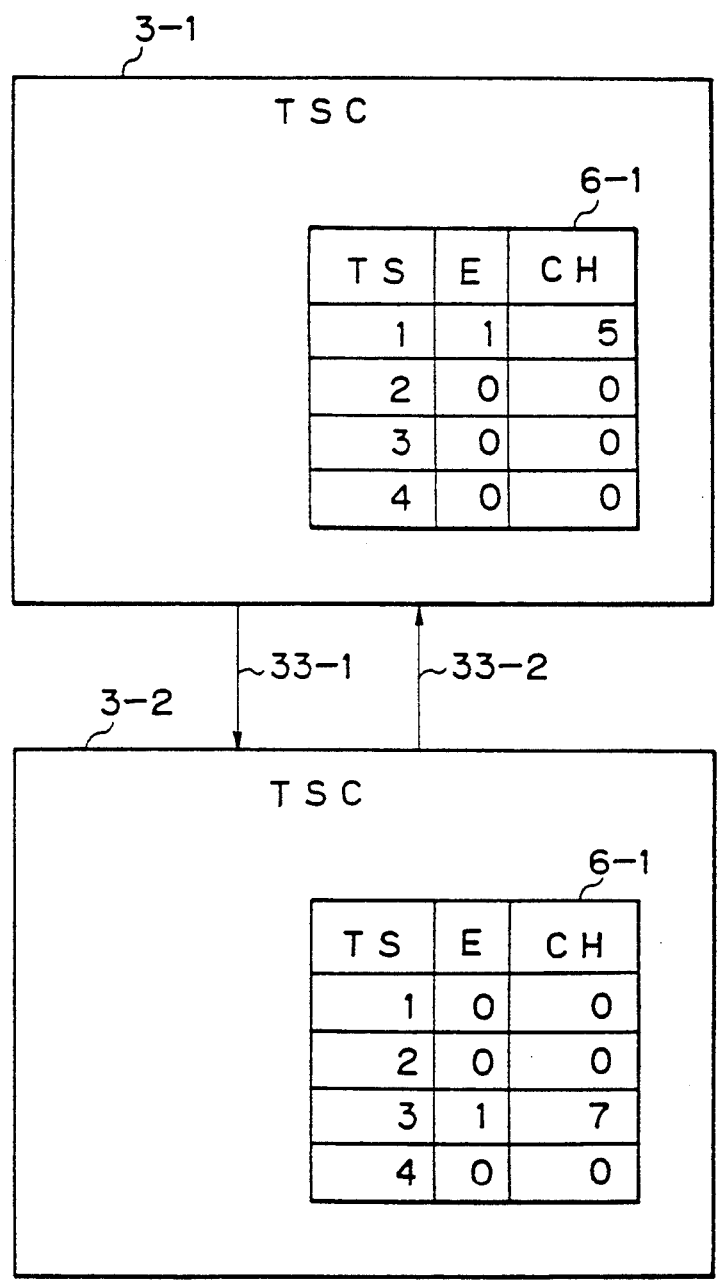

Assuming that the instructions to assign a channel address "5" (CH5) to a time slot "1" (TS1) has been issued by a communication control program of a microprocessor unit 1-1, a time slot assignment circuit 5-1 checks the state of E flag of TS1 in a time slot table 6-1. Consequently, it is confirmed that E flag of TS1 in a time slot table 6-1 is not "1". Therefore, the channel address corresponding to the indicated channel, i.e., CH5 is assigned to TS1 and E flag of TS1 is set at "1", indicating an enable bit, as shown in FIG. 7. Further, the exclusive control signal for instructing the other time slot control unit 3-2 not to use TS1, is sent to the other time slot control unit 3-2. In the other time slot control unit 3-2, the time slot assignment circuit 5-2 checks the state of E flag of TS1 in the time slot table 6-2 in order to confirm whether TS1 is used or not. Consequently, it is confirmed that E flag or TS1 in the table 6-2 is "0", and therefore no procedure is executed in response to the exclusive control signal. Further, in the initial state, assuming that the instructions to assign CH7 to TS3 has been issued by a communication control program of a microprocessor unit 1-2; a time slot assignment circuit 5-2 checks the state of E flag of TS3 in a time slot table 6-2. Consequently, it is confirmed that E flag of TS3 in a time slot table 6-2 is not "1" and is enable. Therefore, the channel address corresponds to the indicated channel, i.e., CH7 is assigned to TS3 and E flag of TS3 is set at "1", as shown in FIG. 7. Further, similar to the above mentioned procedure of exclusive control executed at TS1, it is confirmed that TS3 is not used in the other time slot control unit 3-1 and no conflict occurs between the two time slot control units 3-1, 3-2.

Figure 8:
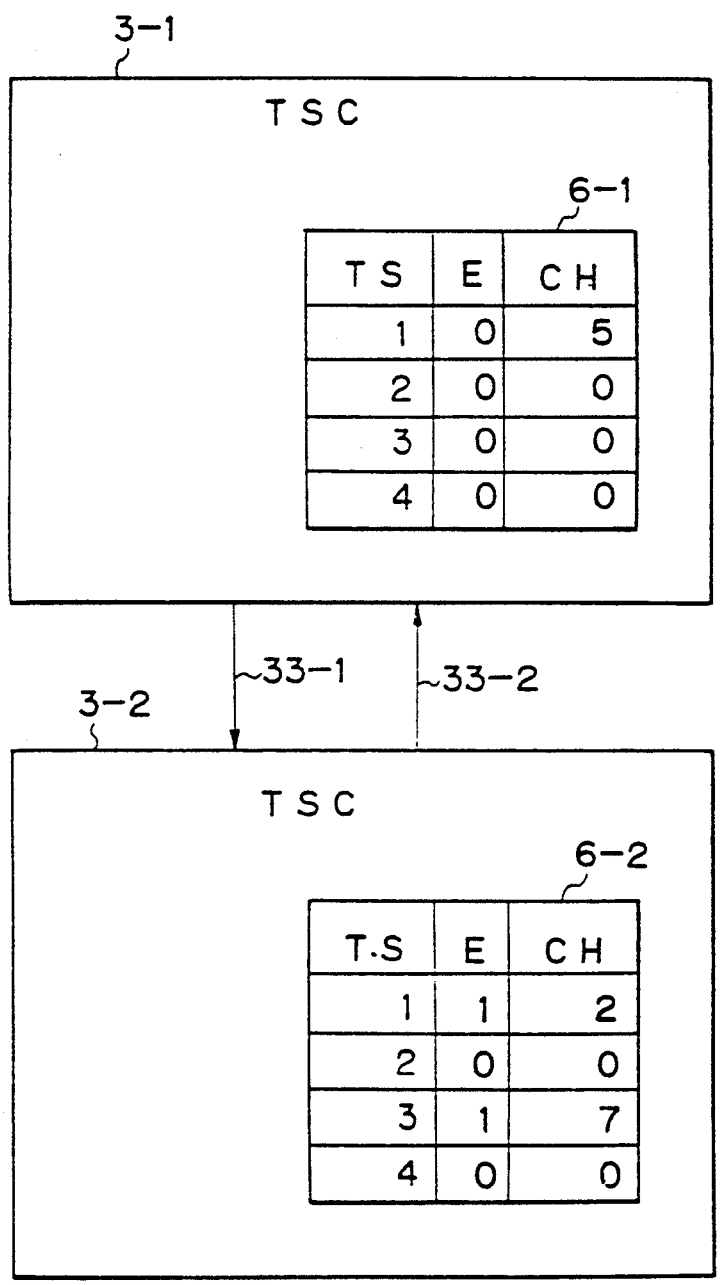

In the state shown in FIG. 7, assuming that the instructions to assign CH2 to TS1 has been issued by a communication control program of a microprocessor unit 1-2; a time slot assignment circuit 5-2 checks the state of E flag of TS1 in a time slot table 6-2. Consequently, it is confirmed that E flag of TS1 in a time slot table 6-2 is not "1". Therefore, the channel address corresponding to the indicated channel, i.e., CH2 is assigned to TS1 and E flag of TS1 is set at "1", as shown in FIG. 8. Further, the exclusive control signal for instructing the other time slot control unit 3-1 not to use TS1, is sent to the other time slot control unit 3-1. In the above time slot control unit 3-1, the time slot assignment circuit 5-1 checks the state of E Flag of TS1 in the time slot table 6-1 in order to confirm whether TS1 is used or not. Consequently, it is confirmed that E flag of TS1 in the table 6-1 is "0", and therefore the above E flag is reset to "0" as shown in FIG. 8. Further, the intercepting signal for notifying the microprocessor unit 1-1 of a cancellation of assignment of the channel address used until now (in this case CH5) is issued from the time slot control unit 3-1.

Figure 9:
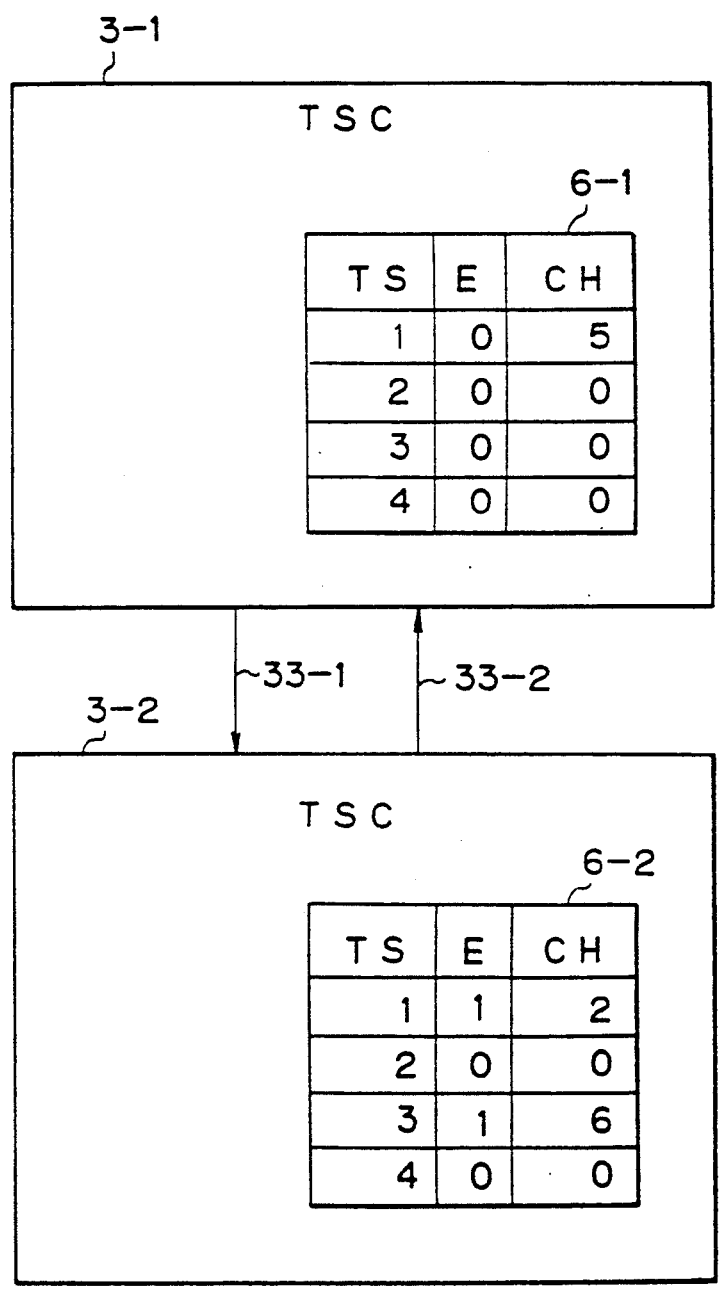

In the state as shown in FIG. 8, assuming that the instructions to assign CH6 to TS3 has been issued by a communication control program of a microprocessor unit 1-2; a time slot assignment circuit 5-2 checks the state of E flag of TS3 in a time slot table 6-2. Consequently, it is confirmed that E flag of TS1 in a time slot table 6-2 is "1". Therefore, the channel address corresponding to the indicated channel, i.e., CH6 is newly assigned to TS1. Namely, channel address assigned to TS3 is changed over from CH7 to CH6, as shown in FIG. 9. Further, the intercepting signal for notifying the microprocessor unit 1-2 of a cancellation of assignment of the channel address used until now (in this case CH7) is issued from the time slot control unit 3-2.

Also, the exclusive control signals for instructing the other time slot control unit 3-1 not to use TS3 is sent to the other time slot control unit 3-1. In the above time slot control unit 3-1, the time slot assignment circuit 5-1 checks the state of E flag of TS3 in the time slot table 6-1, in order to confirm whether TS3 is used or not. Consequently, it is confirmed that E flag of TS3 in the table 6-1 is "0", and therefore no procedure is executed is response to the exclusive control signal.

In the state shown in FIG. 9, it is assumed that the instructions to assign CH8 and CH9 simultaneously to TS2 have been issued by both microprocessor units 1-1, 1-2 respectively.

Two time slot assignment circuits 5-1, 5-2 check the state of E flags of TS2 respectively. Consequently, it is confirmed that both E flags are "0". Therefore, each E flag is set at "1" and each indicated channel address is assigned to TS2. Further, the exclusive control signals for instructing the other time slot control unit not to use TS2, is sent to the other time slot control unit.

Figure 10:
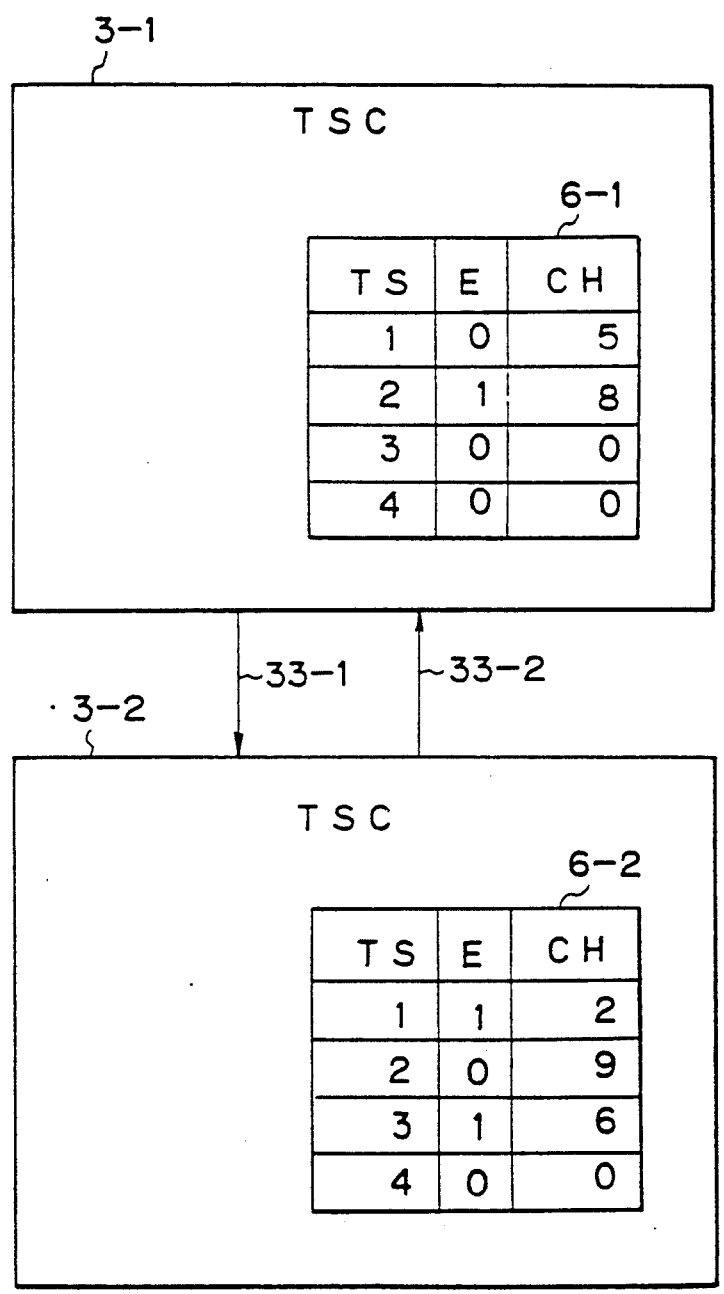

In this case, it is assumed that it is predetermined that the time slot control unit 3-1 has higher priority levels than the other time slot control unit 3-2. Then, the former time slot control unit 3-1 neglects the exclusive control signal sent from the latter time slot control unit 3-2. On the other hand, when the latter control unit 3-2 has received the exclusive control signal from the former control unit 3-1, E flag of TS2 in the latter control unit 3-2 is reset to "0", as shown in FIG. 10. Further, the intercepting signals for notifying the microprocessor unit 1-2 of the channel address which cannot be assigned (in this case CH9) is sent to the microprocessor unit 1-2.

Figure 11:
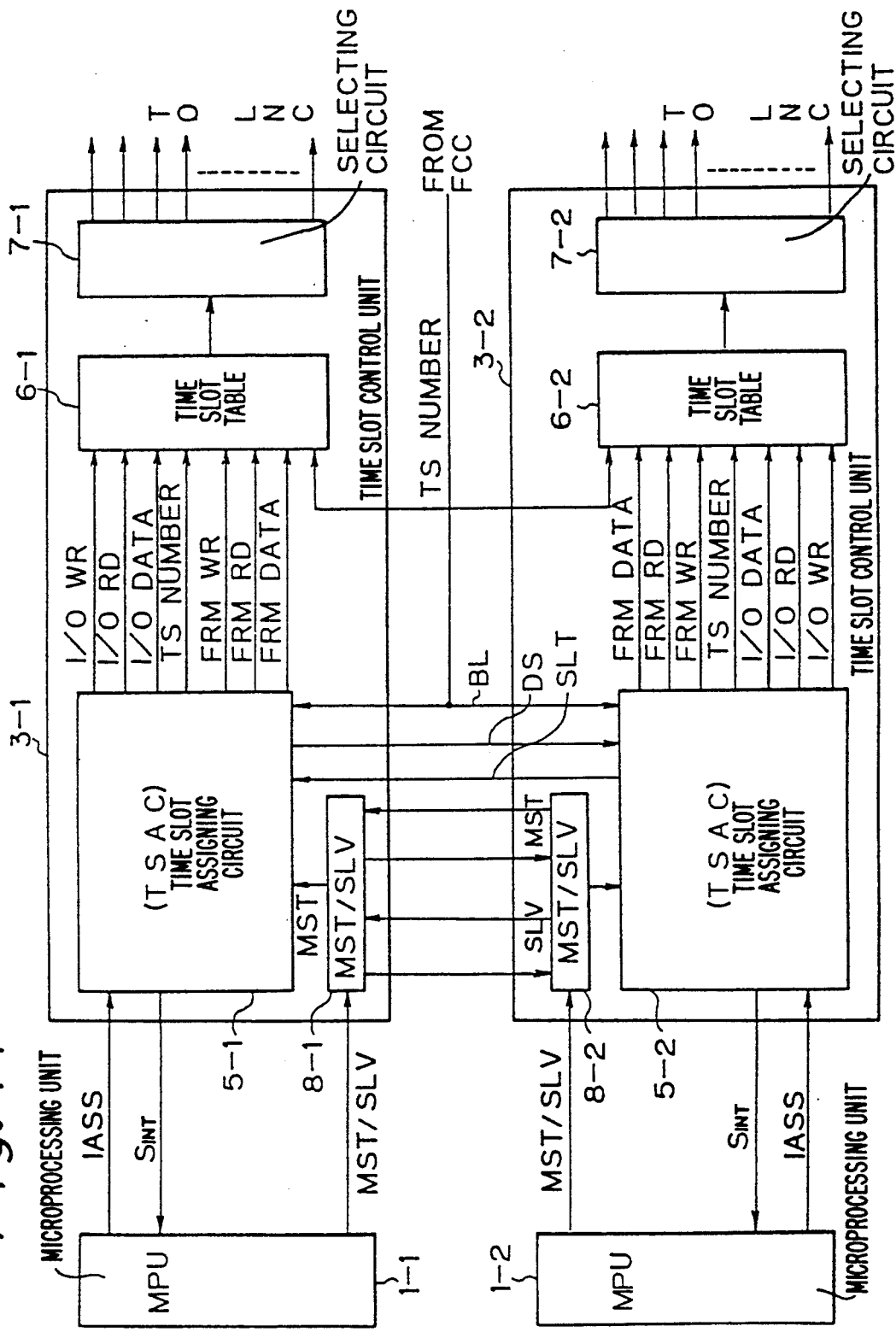
FIG. 11 is a detailed example of a communication control processor shown in FIG. 4.

FIG. 11 is a detailed example of a communication control processor shown in FIG. 4.

In FIG. 11, two time slot control units 3-1, 3-2 having the same configuration are connected to two microprocessor units 1-1, 1-2 respectively, as already shown in FIG. 4. Time slot control units 3-1, 3-2 comprise time slot assignment circuits (TSAC) 5-1, 5-2 which execute channel assignment or cancellation thereof, time slot tables 6-1, 6-2, which stores the correspondence between channel addresses and time slots, and selecting circuits 7-1, 7-2, which select the channels to use from line control units 2-1, 2-2 (see FIG. 4), respectively, similar to time slot control units shown in FIG. 5. Further, the time slot control units 3-1, 3-2 in FIG. 11 have MST/SLV (master/slave) circuits 8-1, 8-2, in addition to the above three kinds of components. These MST/SLV circuits 8-1, 8-2, are operative to receive MST/SLV signals (priority level signal) indicating each priority level of a time slot control unit from microprocessor units 1-1, 1-2 respectively, and then discern which time slot control unit has the higher priority.

Here, the process of generating clock signals and frame synchronizing signals for controlling whole multiplex lines will be explained. Large amounts of data from multiplex lines are received in a frame control circuit 4 (see FIG. 4). Further, a clock signal is extracted from the received data, and a frame synchronizing signal for processing the received data by the unit of a frame is generated from the clock signal. Further, FRM WR (frame write) signals, FRM RD (frame read) signals and FRM DATA (Frame data) signals are generated in time slot assignment circuits 5-1, 5-2 in accordance with the clock signal and the frame synchronizing signal. Also, the number of time slots (time slot number) is generated in time slot assignment circuits 5-1, 5-2 by dividing the clock signal.

Figure 12:
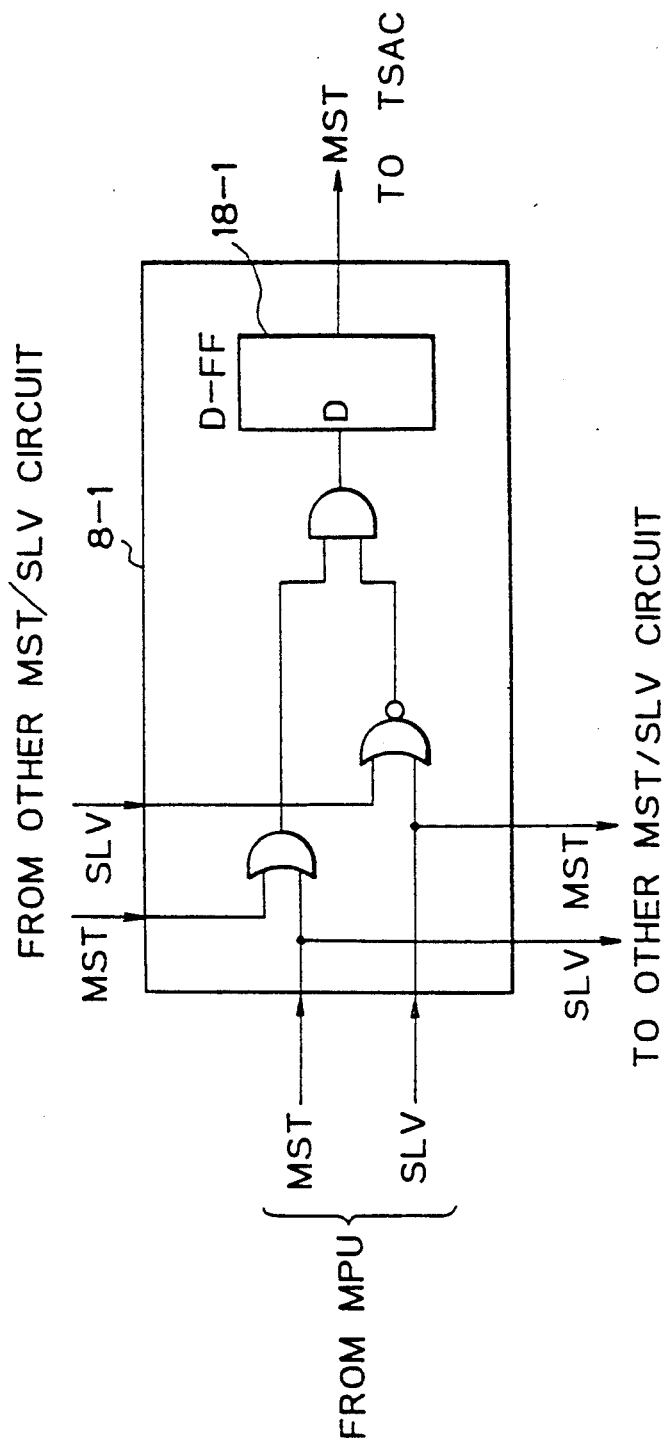
FIG. 12 is a detailed circuit diagram of a master/slave circuit shown in FIG. 11.

FIG. 12 is a detailed circuit diagram of MST/SLV circuit shown in FIG. 11.

In FIG. 12, only one MST/SLV circuit 8-1 of two MST/SLV circuits 8-1, 8-2 will be illustrated for simplifying the explanation. In this case, each of MST/SLV circuits 8-1, 8-2 decides whether or not there is the priority right between two time slot control units 3-1, 3-2, in accordance with MST/SLV signals issued from two microprocessor units 1-1, 1-2 respectively, and sends a MST signal indicating which time slot control unit has the priority right to the corresponding time slot assignment circuit. Further, MST/SLV circuit 8-1 executes logical OR in an OR gate, between a MST signal indicating a higher priority than the corresponding microprocessor unit 1-1 and a MST signal from the other microprocessor unit 1-2. Further, a MST/SLT circuit 8-1 executes a logical NOR, in a NOR gate, between a SLV signal indicating a lower priority than the corresponding processor unit 1-1 and SLV signal from the other microprocessor unit 1-2. Further, the MST/SLV circuit 8-1 executes a logical AND in a AND gate, between output signal from the OR gate and that from the NOR gate. The output signal from the AND gate is sent to D-FF18-1 (D-flip flop) as the input of D-FF18-1. A MST signal output from the above D-FF18-1 is sent to the corresponding time slot assignment circuit 5-1. Further, each of MST/SLV circuits 18-1, 18-2 is operative to send its own MST signal and SLV signal to the other MST/SLV circuit.

To be more specific, in the initial state, D-FF18-1 is set at "SLV", i.e., "0", indicating a lower priority. If MST signals from at least one microprocessor unit become active and both SLV signals become inactive, D-FF18-1 is set at "MST", i.e., "1", or otherwise, the D-FF18-1 is sent to "SLV", i.e., "0". A MST/SLV circuit 8-1 must be controlled so that a MST signal is not output from the MST/SLV circuit 8-1 simultaneously with the signal from the other MST/SLT circuit 8-2. Therefore, when the D-FF in either one of the MST/SLV circuits 8-1, 8-2 is set at "SLV", a MST signal is sent from the corresponding MST/SLV circuit to the other. On the other hand, when the above D-FF is set at "MST", a SLV signal is sent to the other MST/SLV circuit. When both MST/SLV circuits 8-1, 8-2 are instructed to be set at "SLV", a MST signal is sent from each MST/SLV circuit to the other MST/SLV circuit. In this case, when the MST signal and SLV signal are sent simultaneously, the instruction of a SLV signal is given priority over a MST signal, in order to prevent both D-FF18-1, 18-2 in MST/SLV circuits 8-1, 8-2 from being set "MST" simultaneously.

Figure 13:
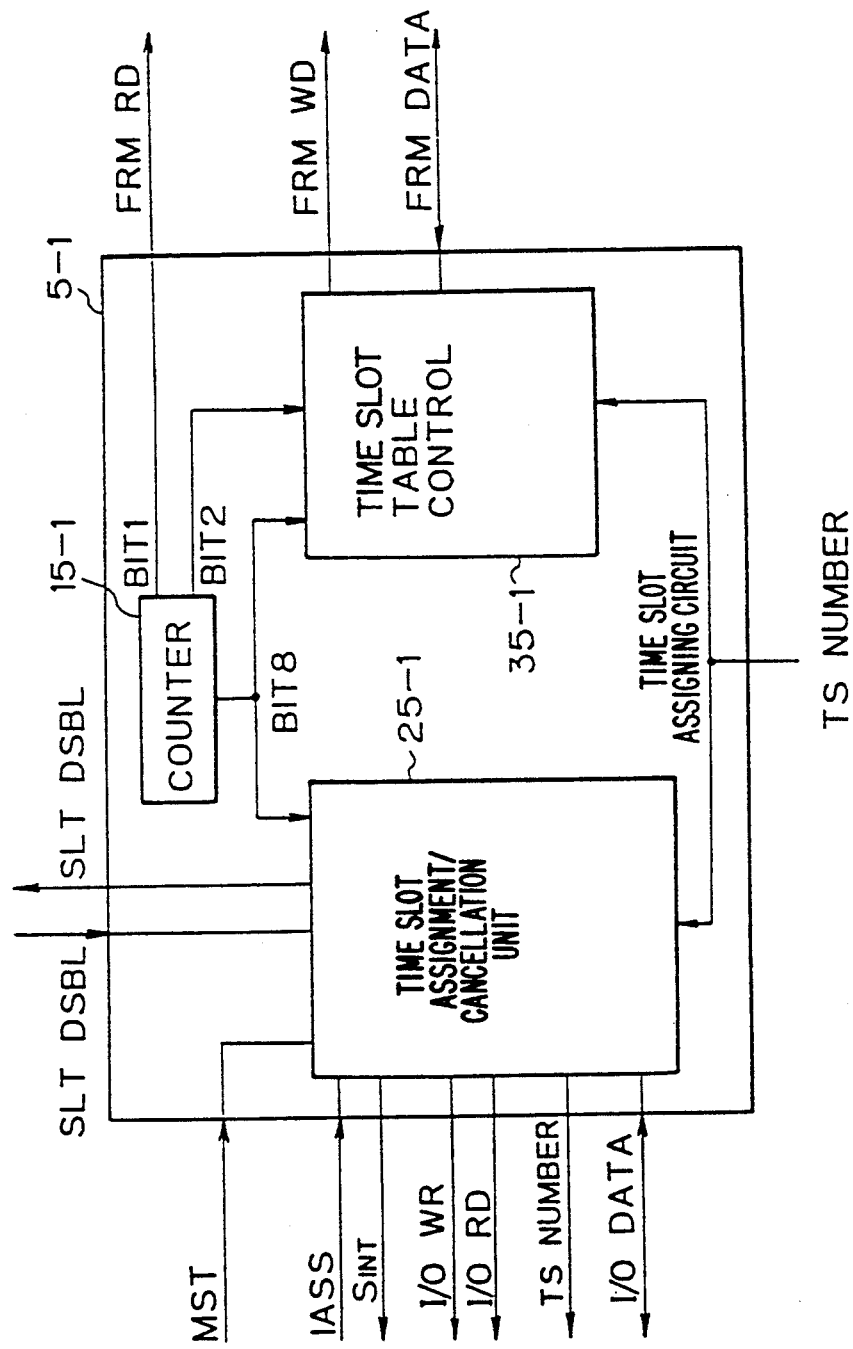
FIG. 13 is a detailed circuit diagram of a time slot assignment circuit shown in FIG. 11.

FIG. 13 is a detailed circuit diagram of a time slot assignment circuit shown in FIG. 11. From FIG. 13 through FIG. 17, only one of two circuits will be illustrated to simplify the explanation.

In FIG. 13, time slot assignment circuits 5-1, 5-2 comprise counters 15-1, 15-2, time slot assignment/cancellation units 25-1, 25-2 and time slot table control units 35-1, 35-2, respectively. In this case, data of one frame consist of eight bits. Counter 15-1 counts the above bit at every time slot. The first bit (bit "1") is sent to a time slot table 6-1 as FRM RD (frame read) signal, the second bit (bit "2") is sent to a time slot control unit 35-1 and the eighth bit (bit "8") is sent to a time slot assignment/cancellation unit (TS ASS/CAN) 25-1 and a time slot table control unit (TS TABLE CONTROL) 35-1. The counter 15-1 is reset to "0", every time the data of one frame are completely transferred.

The time slot assignment/cancellation unit 25-1 executes the instructions for channel assignment/cancellation, and also executes exclusive control so that the above unit 25-1 and the other unit 25-2 do not scramble each other when obtaining the same time slot. Further, the above time slot assignment/cancellation unit 25-1 notifies the corresponding microprocessor unit 1-1 of the channel address corresponding to the channel that has been removed by the other time slot assignment/cancellation unit 25-2 or has changed by itself. When the time slot assignment/cancellation unit 25-1 receives instructions for channel assignment, the above unit 25-1 writes the channel number in the corresponding time slot of a time slot table 6-1 to execute channel assignment. Then, if the above time slot has already been used, the time slot assignment/cancellation unit 25-1 cancels the correspondence between the presently assigned channel and the time slot number and assigns the newly indicated channel address to the time slot. Further, the time slot assignment/cancellation unit 25-1 sends the intercepting signal for notifying the microprocessor unit 1-1 of the channel number used before. Further, when the time slot assignment/cancellation unit 25-1 has assigned the channel address to the time slot, the above unit 25-1 sends a SLT DSBL (slot disable) signal, for inhibiting the assignment of the other channel to the above time slot, to the other time slot assignment circuit 5-1. When the other time slot assignment circuit 5-1 has received the SLT DSBL signal, the corresponding time slot assignment/cancellation unit 25-1 cancels the correspondence between the presently assigned channel and the time slot, if the above time slot is presently used. Further, the above time slot assignment/cancellation unit 25-1 sends the intercepting signal for notifying the microprocessor unit 1-1 of the channel address corresponding to the channel that has canceled the assignment. The time slot table control unit 35-1, 35-2 manage the respectively corresponding time slot table 6-1, 6-2 by the output signals from the respectively corresponding counters 15-1, 15-2.

Figure 14:
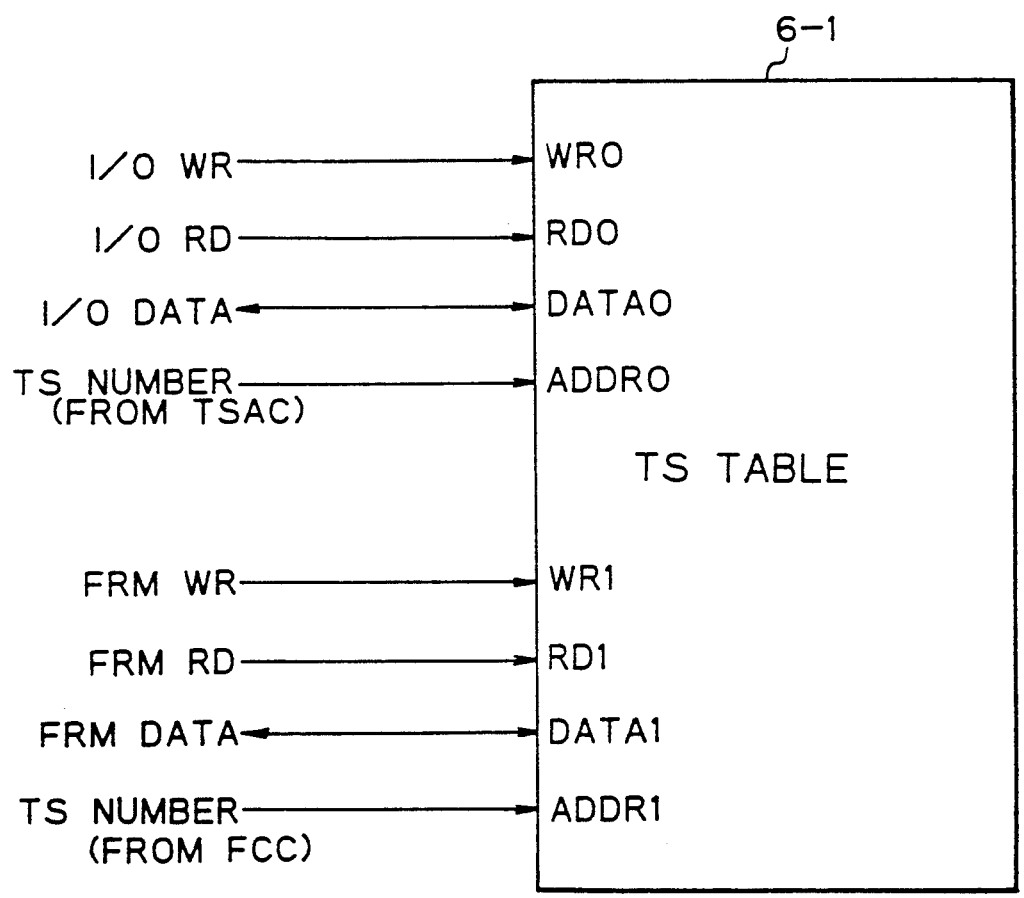
FIG. 14 is an example of a time slot table shown in FIG. 11.

FIG. 14 is an example of a time slot table shown in FIG. 11.

In FIG. 14, the flow of the input signals and the output signals of the time slot table 6-1 is illustrated. In this case, each of the two time slot tables 6-1, 6-2 is composed of a dual port RAM (random access memory). Four kinds of signals, i.e., write signals (WR), read signals (RD), data signals (DATA) and time slot numbers (addresses), are input or output for each port. One port 0 is used for writing or reading the data in accordance with the instruction from a time slot assignment/cancellation unit 25-1. The other port 1 is used for writing or reading the time slot number presently used, between a time slot table control unit 35-1 and a time slot table 6-1.

FIG. 15 is a diagram showing the content of the time slot table shown in FIG. 11.

In FIG. 15, EO flag is indicated, in addition to E flag shown in FIGS. 6, 7, 8, 9 and 10. In other words, the correspondence between each state of E flag and EO flag and each time slot is indicated, together with the correspondence between the channel address and each time slot, in a time slot table 6-1. Each E flag indicates whether or not the corresponding time slot is presently used, synchronous with the frame. On the other hand, each EO flag indicates whether or not the instructions of channel assignment or the cancellation thereof are received, asynchronous with the frame. If both E flag and EO flag are "0", the corresponding time slot is not used (disable) and therefore the channel address of the above time slot is not assigned to the time slot. If E flag is "0" and EO flag is "1", the instruction of channel assignment is received but the corresponding time slot is not yet used. Here, the channel address of the above time slot corresponds to the nearly indicated channel. If both E flag and EO flag are "1", the corresponding time slot is presently used (enable). If E flag is "1" and EO flag is "0", the corresponding time slot is presently used but cancellation instructions for channel assignment are received. In other words, when channel assignment or cancellation instructions thereof have been received, the state of EO flag is immediately changed and soon after, the state of E flag is also changed.

Figure 16:
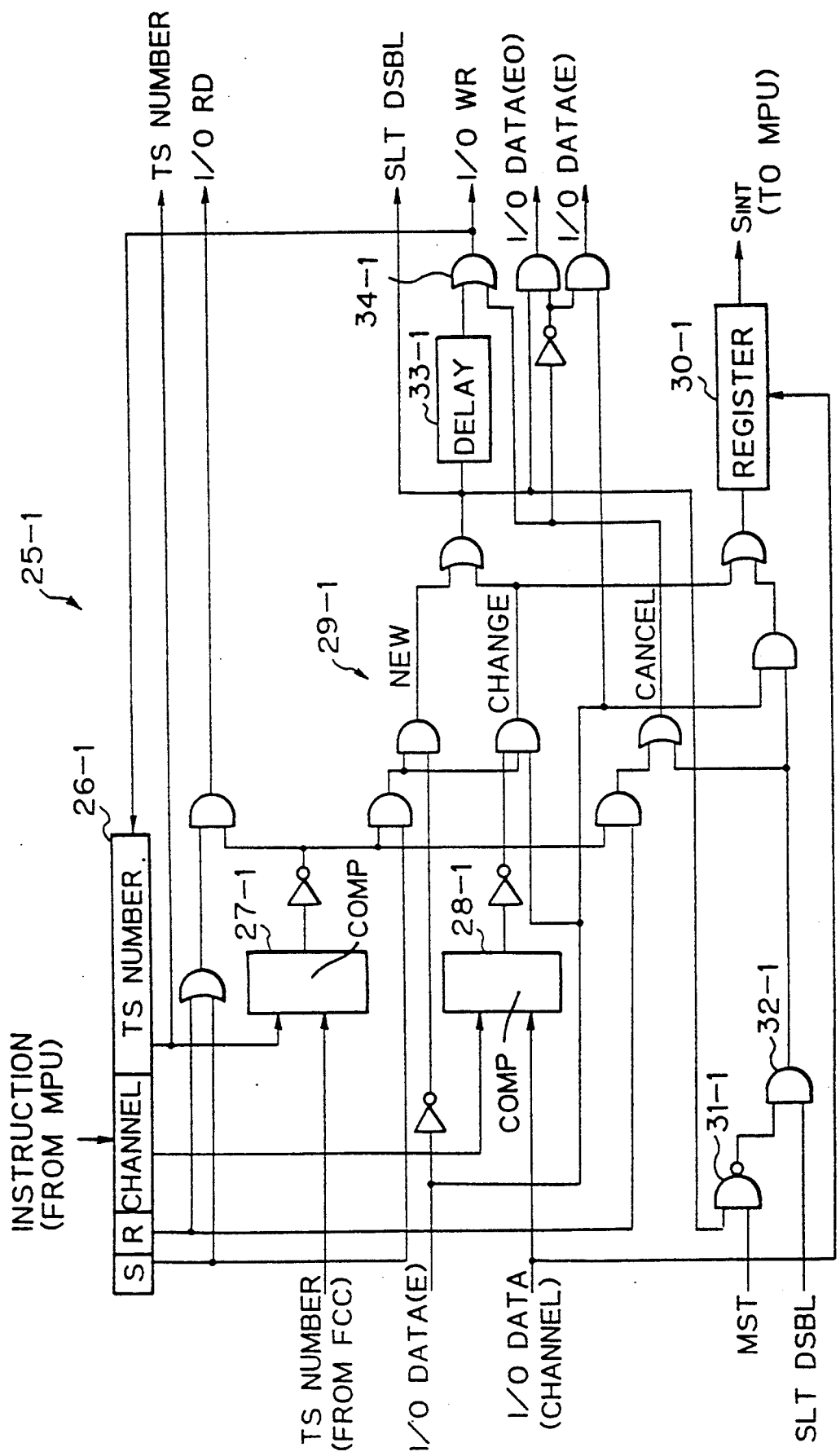
FIG. 16 is a detailed circuit diagram of a time slot assignment/cancellation unit shown in FIG. 13.

FIG. 16 is a detailed circuit diagram of a time slot assignment/cancellation unit shown in FIG. 13.

In FIG. 16, a time slot assignment/cancellation unit 25-1 has an instruction register (IR) that temporarily stores channel assignment/cancellation instructions from the microprocessor unit 1-1. The above instructions include bit S, bit R, channel address and a time slot number. If the instructions for channel assignment are input to the instruction register 26-1, bit S is set to "1". If the instructions for channel cancellation is input, bit R is set to "1". When the instructions stored in the instructions register 26-1 are output, the channel address and E flag corresponding to the indicated time slot are read out. Further, the time slot number issued from the instruction register 26-1 and the executing time slot issued from a frame control circuit 4 are compared with each other in a first comparator (COMP) 27-1.

If it is confirmed that the above two time slot numbers are coincident by the comparator 27-1, the presently assigned channel address cannot be changed and therefore the instructions are put in a wait state. If bit S is set to "1" in the instruction register 26-1, the presently used channel address and the newly indicated channel address by the instructions are compared in a second comparator 28-1. The result of the comparison by each of the first and second comparators 27-1, 28-1 and the state of E flag are sent to a group of gate circuits 29-1. The group of gate circuits 29-1 determines if the type of assignment by the instruction is the new assignment (NEW) or the change of assignment (CHANGE). If it is confirmed that it is the change of assignment by the above circuits 27-1, the channel address of time slot table 6-1 corresponding to the presently executing time slot is written in the notified channel address resister 30-1 and is sent to the microprocessor unit 1-1. Further, in both the new assignment and the change of assignment, SLT DSBL signals are sent from one time slot assignment/cancellation unit to the other unit respectively. Further, when bit R is set to "1" in the instruction register 26-1 and when it is confirmed that two time slot numbers are not concident by the first comparator 27-1 or the SLT DSBL signals is received from the other time slot assignment/cancellation unit, the cancellation of channel assignment (CANCEL) is executed. Further, it is assumed that the instructions for channel assignment are sent to both time slot assignment/cancellation units 25-1, 25-2 simultaneously, namely, SLT DSBL signals are issued from both units 25-1, 25-2 simultaneously. In this case, a NAND gate 31-1 and a AND gate 32-1 are operative to allow the master microprocessor unit selected by master/slave circuits 8-1, 8-2 to ignore either one of the SLT DSBL signals. Further, when the AND gate 32-1 receives a SLT DSBL signal and the corresponding time slot is presently used, the channel address of the time slot table corresponding to the above time slot is written in the notified channel address register 30-1 and is sent to the corresponding microprocessor unit. When it is determined that either one of the new assignments or the change of assignment or the cancellation of channel assignment is the type the corresponding information is written in time slot table 6-1 and the instruction register 26-1 is reset. Further, the time slot assignment/cancellation unit 25-1 includes an adjusting unit e.g., delay unit 33-1 for making two inputs in a OR gate 34-1 to conform to each other.

Figure 17:
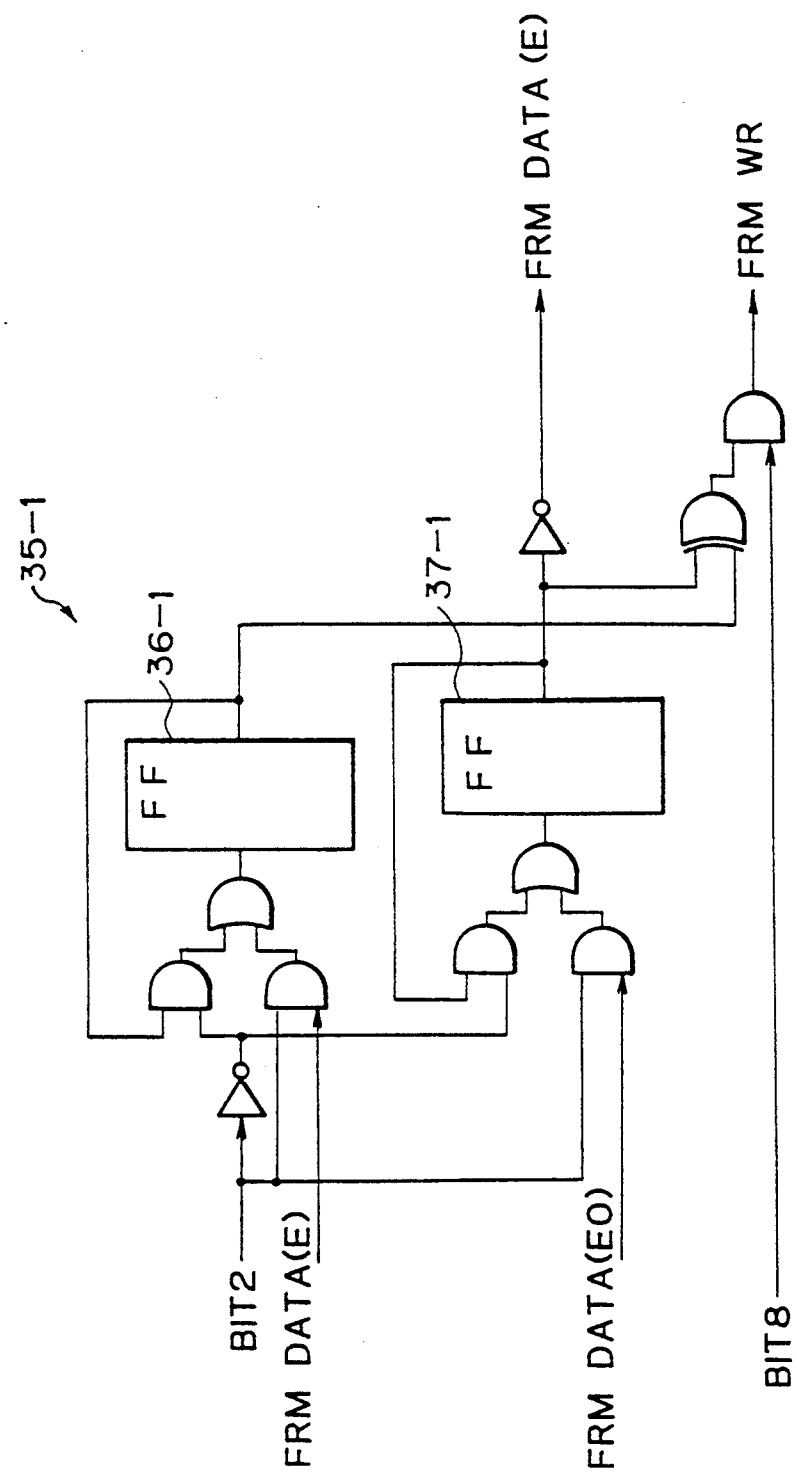
FIG. 17 is a detailed circuit diagram of a time slot table control unit shown in FIG. 13.

FIG. 17 is a detailed circuit diagram of a time slot table control unit shown in FIG. 13.

The output of E flag and EO flag of the presently executing time slot is read out from the time slot table 6-1 (see FIG. 15), by the output signal of bit "1" from the counter 15-1 (see FIG. 13), in the timing of bit "1" of the time slot. In FIG. 17, the above output of E flag and EO flag are sent to a first flip flop 36-1 and a second flip flop 37-1 of a time slot table control unit 35-1, respectively, and each flip flop is set, in the timing of bit "2" of the time slot. If both the first and second flip flops are set to "0" or "1", no procedure is executed. If the first flip flop 36-1 is set to "0" and the second flip flop 37-1 set to "1", the corresponding E flag of the time slot table 6-1 is set to "1" in the timing of bit "8" of the time slot. If the first flip flop 36-1 is set to "1" and the flip flop 37-1 set to "0", the corresponding E flag of the time slot table 6-1 is set to "1" in the timing of bit "8".

According to a preferred embodiment described with reference to FIG. 4 to FIG. 17, even if the same instructions for channel assignment are issued simultaneously from two different microprocessor units, it is possible for the channel of only one of two different line control units to be assigned to a given time slot. Therefore, it is ensured that one time slot is not used by different line control units simultaneously. Further, when the indicated channel has not been assigned or the present used channel has been canceled, it is possible for the processor unit to know the above channel by the intercepting signal for giving notice of the corresponding channel address.

In the above embodiment, a fault tolerant communication control processor comprising only two time slot control units has been explained. However, the present invention can provide a communication control processor comprising more than two time slot control units. In this case, it is necessary for all time slot control units to be connected to one another by exclusive control lines.

Figure 18:
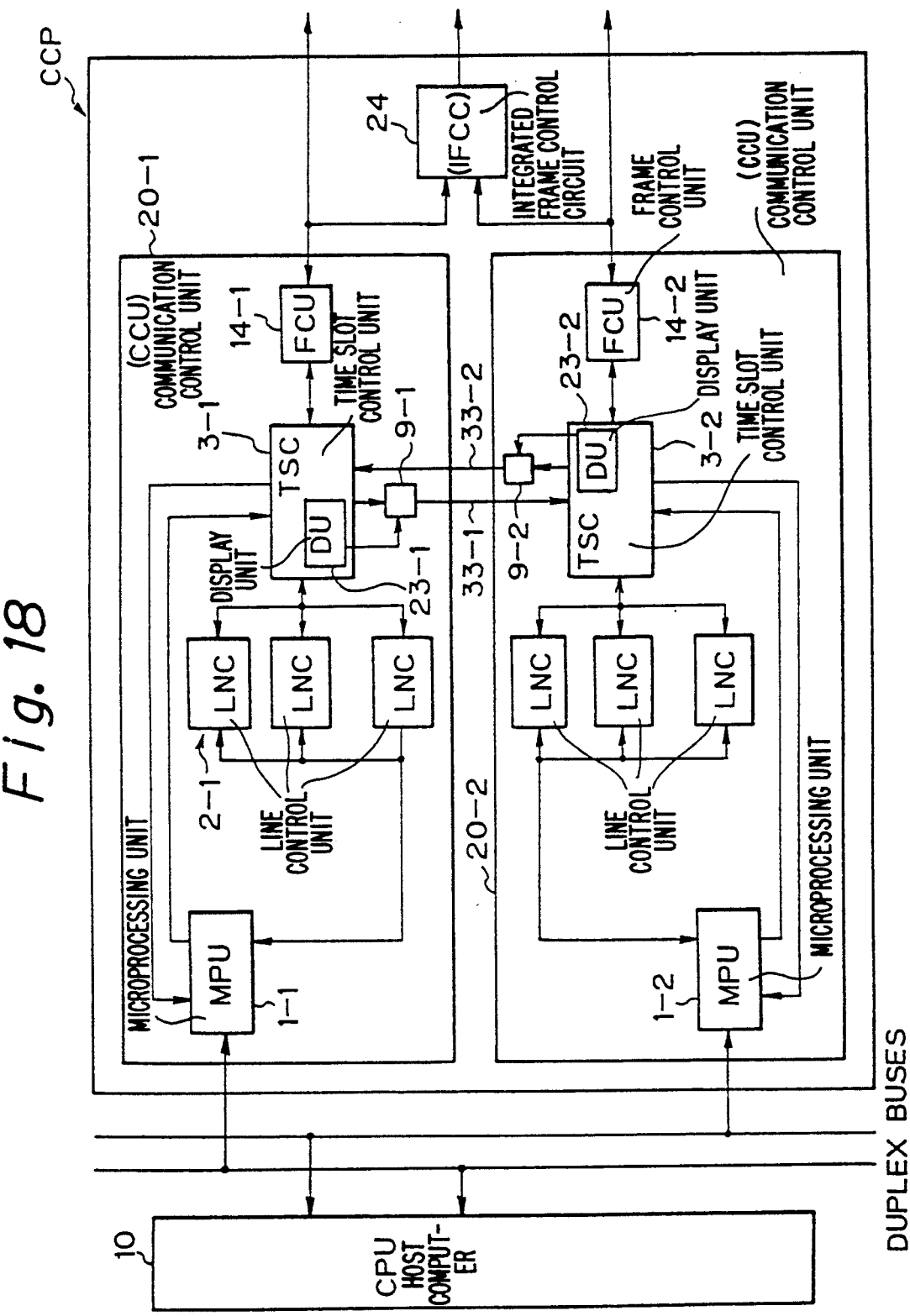
FIG. 18 is a block diagram showing other preferred embodiments of a communication control processor according to the present invention.

FIG. 18 is a block diagram showing other preferred embodiments of a communication control processor according to the present invention.

In the above embodiment, two communication control unit (CCU) 20-1, 20-2 are provided in a communication control processor. The two communication control units 20-1, 20-2 have frame control units (FCU) 14-1, 14-2 for transmitting or receiving the respectively corresponding data by the frame unit, independently. Further, an integrated frame control circuit (IFCC) 24 that combines the output signals from the above frame control units 14-1, 14-2 into one group of transferred data, is provided in FIG. 18.

In FIG. 18, a communication control processor has interrupting circuits 9-1, 9-2 and display units (DU) 3-1, 3-2, respectively, in addition to microprocessor units 1-1, 1-2, line control units 2-1, 2-2 and time slot control units 3-1, 3-2 shown in FIG. 4. The interrupting circuits 9-1, 9-2 execute the process forbidding exclusive control signals to be transferred to the other time slot control units, under the control of time slot control unit 3-1, 3-2, respectively. Further, the display units 23-1, 23-2, which are provided in time slot control unit 3-1, 3-2 respectively, indicate which duplexing mode or non-duplexing (single) mode is presently selected as the mode of data communication, under the control of microprocessor units 1-1, 1-2, CPU 10 and the like.

To be more specific, time slot control units 3-1, 3-2 control interrupting circuits 9-1, 9-2 and display units 23-1, 23-2 are as follows;

When a duplexing mode is indicated by the display units 23-1, 23-2, the interrupting circuits 9-1, 9-2 are not operative and exclusive control signals can be transferred from one time slot control unit to an other, via exclusive control lines 33-1, 33-2 respectively. Therefore, the exclusive control for ensuring duplex data communication control, is executed; and on the other hand, when a non-duplexing mode is indicated by the display units 23-1, 23-2, the interrupting circuits 9-1, 9-2 are operative and exclusive control signals are interrupted and can not be transferred. Therefore, the process forbidding exclusive control signals is executed.

According to the embodiment shown in FIG. 18, either one of duplexing mode or non-duplexing mode can be selected according to the request of users. Therefore, even users who do not desire duplex data communication control can utilize a fault tolerant communication control processor. Further, the testing of two communication control units, in which a duplexing mode is not necessary, can be executed effectively without the influence of exclusive control.

Figure 19:
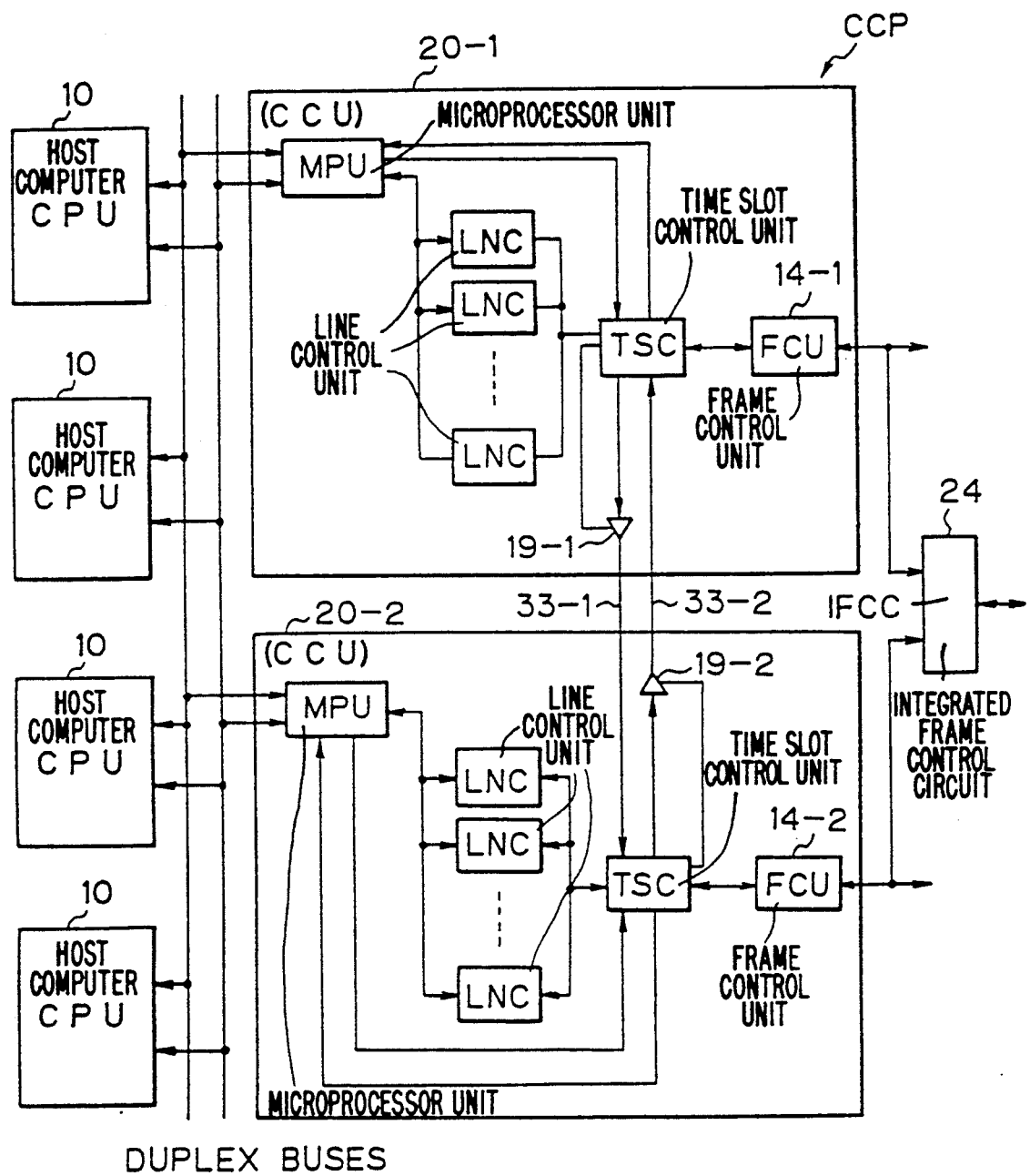
FIG. 19 is a block diagram showing more concretely the embodiment shown in FIG. 18.

FIG. 19 is a block diagram showing more concretely the embodiment shown in FIG. 18.

In FIG. 19, tri-state buffers 19-1, 19-2 are provided respectively as the interrupting circuits 9-1, 9-2. Further, in this figure, the description of display units 23-1, 23-2 is omitted. The tri-state buffers 19-1, 19-2 are operative in an active (conducting) state when a duplexing mode is selected and in a cut off state when a non-duplexing mode is selected. Either the active state or the cut-off state of the tri-state buffers 19-1, 19-2 is determined by the level of the control signal issued from time slot control units 3-1, 3-2. If tri-state buffers 19-1, 19-2 are in an active state, exclusive control signals can be transferred from one time slot control unit to another and exclusive control is executed. If they are in a cut-off state, exclusive control signals are interrupted and the process forbidding control signals is executed. Further, in the embodiment shown in FIG. 19, a data communication system having a plurality of CPU10 is disclosed. Also, in this system, an integrated frame control circuit 24 is assembled, in the printed circuit board, different from that of communication control units 20-1, 20-2. In this circuit construction, if the user does not desire duplex data communication control, the communication control processor illustrated in FIG. 18 can be easily used by isolating the integrated frame control circuit from others. In this case, tri-state buffers 19-2, 19-2 are assembled in printed circuit boards of communication control units 20-1, 20-2. However, the circuit construction, in which the tri-state buffers 19-1, 19-2 are included in time slot control units 3-1, 3-2 respectively, is also allowed.

Figure 20:
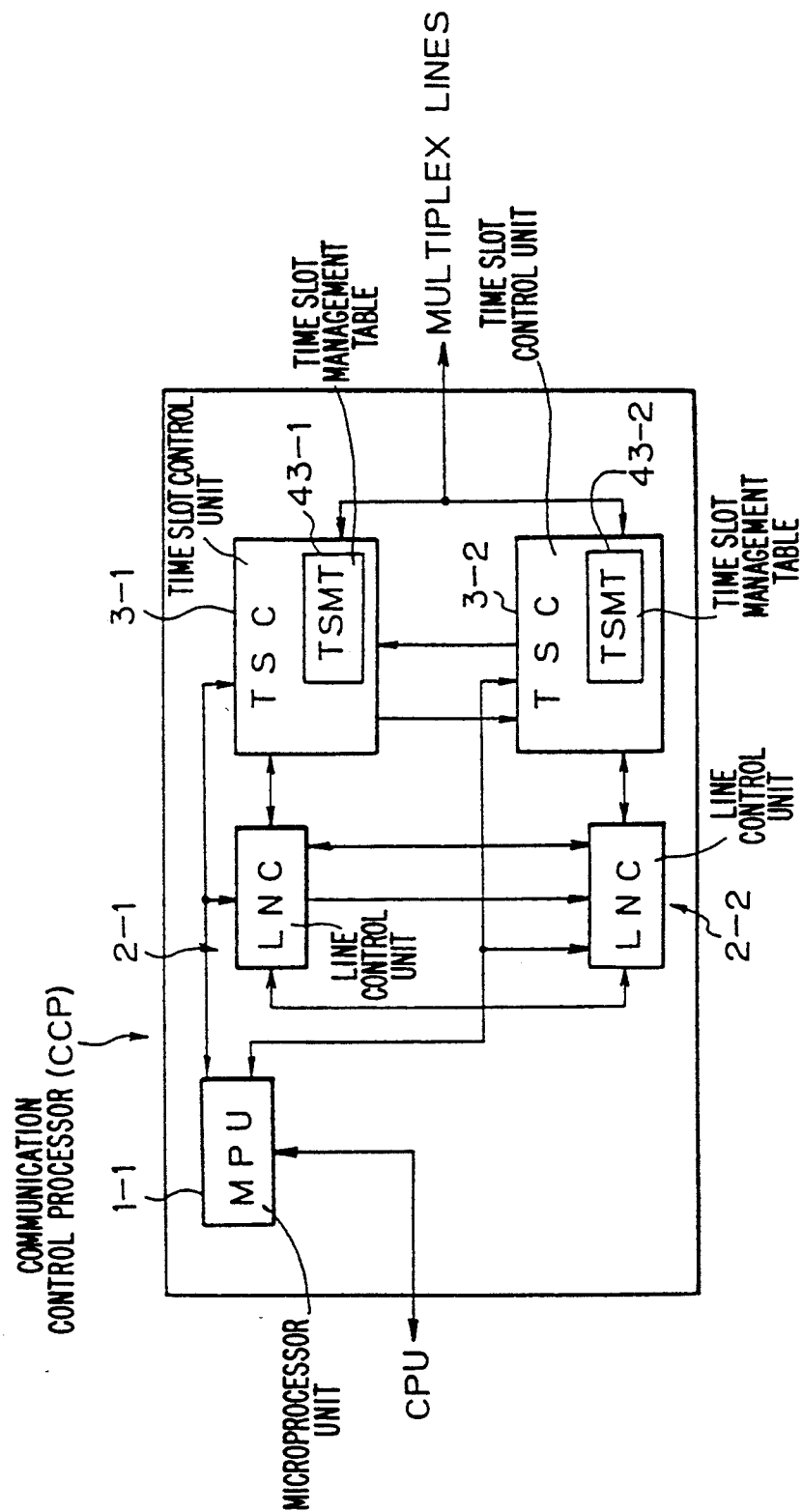
FIG. 20 is a block diagram showing a third preferred embodiment or a communication control processor according to the present invention.

FIG. 20 is a block diagram showing a third preferred embodiment of a communication control processor according to the present invention.

In FIG. 20, a communication control processor comprising two sets of line control units 2-1, 2-2 and two time slot control units 3-1, 3-2, similar to the embodiments mentioned before, as shown in FIG. 4. In this case, each line control unit having a number of channel addresses is illustrated in one block to simplify the diagram. Further, one microprocessor 1-1 is provided for controlling the above line control unit 2-1, 2-2 and time slot control units 3-1, 3-2. In the time slot control units 3-1, 3-2, time slot management tables 43-1, 43-2 are provided respectively. The above time slot management tables 43-1, 43-2 establish the correspondence between the channel addresses and the time slot numbers and have E flags indicating whether each time slot is presently used (enable) or not (disable). When a fault has occurred in the channel address of its own time slot control unit or instructions to interrupt the channel have been issued from the microprocessor unit 1-1 or instructions to render the channel disable have been issued from the other time slot control unit, the microprocessor unit 1-1 is operative to render the corresponding E flag disable. The above operation is executed by referring to time slot management tables 43-1, 43-2.

FIG. 21 is an example of a time slot management table shown in FIG. 20.

In FIG. 21, the construction of the table 43-1, 43-2 is similar to the time slot table 6-1, 6-2 shown in FIG. 6 to FIG. 10, respectively. The two time slot control units 3-1, 3-2 check the content of the respectively corresponding time slot management tables 43-1, 43-2, i.e., the state of E flags at every time slot. Therefore, it is ensured that E flags of the same time slots in different time slot management tables 43-1, 43-2 do not become "1" simultaneously. Further, if a fault has occurred in the presently used time slot, time slot control units 3-1, 3-2 notify a microprocessor unit 1-1 of the corresponding channel address and render all the time slots to which the above channel address is assigned disable. Consequently, data with high reliability are transferred from time slot control units 3-1, 3-2 to multiplex lines by using only enable channels. In this case, the content of time slots can be managed at every time slot and therefore, even if the channel in which the fault has occurred is interrupted, it has no influence on the other normal channels.

Figure 22:
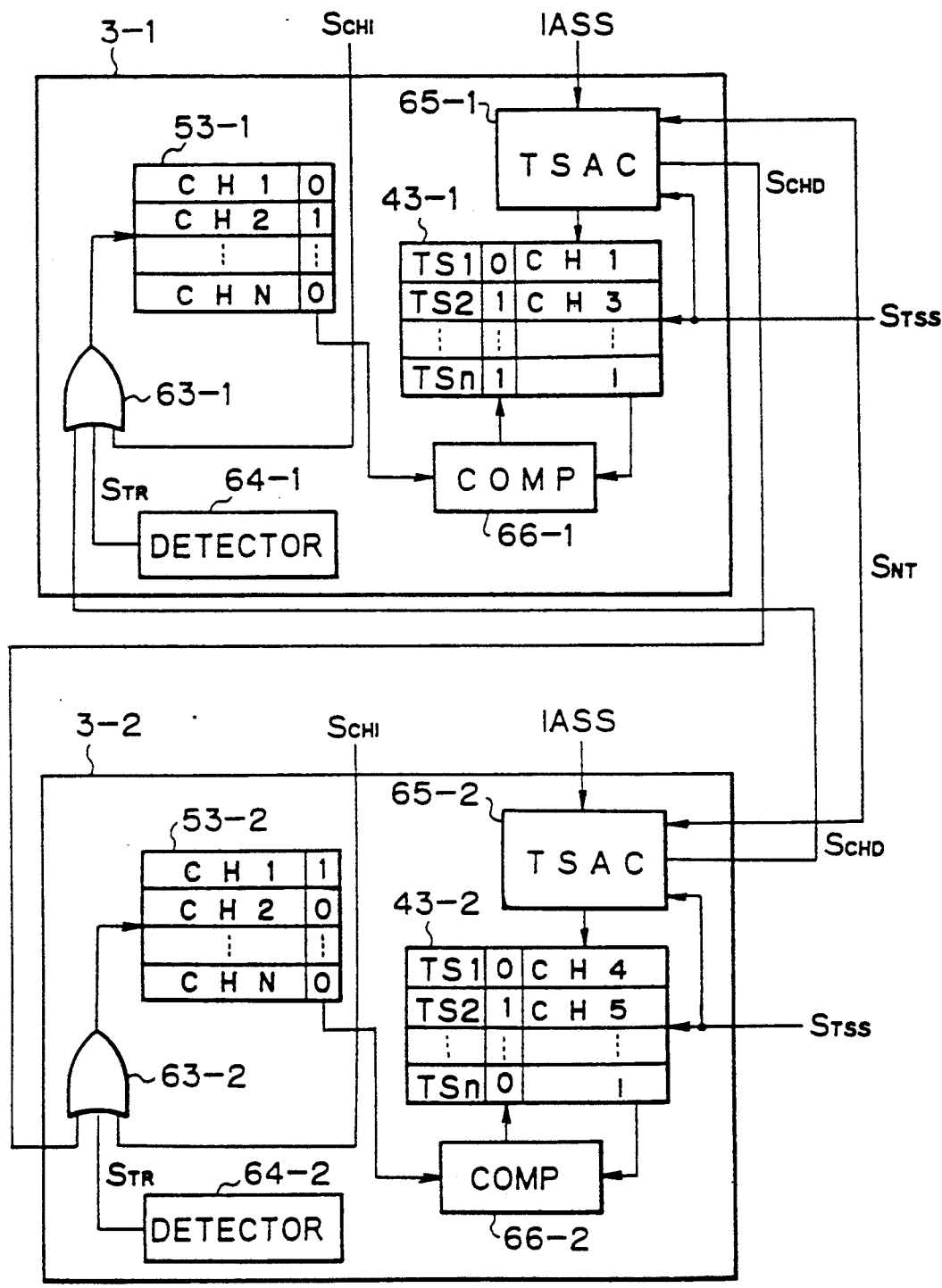
FIG. 22 is a block diagram showing the main part of the embodiment shown in FIG. 20; and, FIG. 23 is another example of a time slot management table shown in FIG. 21.

FIG. 22 is a block diagram showing the main part of the embodiment shown in FIG. 20.

In FIG. 22, the state of the connection between two time slot control units 3-1, 3-2 is disclosed. In this diagram, the time slot management tables 43-1, 43-2 are provided in time slot control units 3-1, 3-2 respectively, similar to FIG. 20. Further, the time slot control units 3-1, 3-2 include channel address tables 53-1, 53-2 that have D (disable) flags of which function is similar to EO flags mentioned before in FIG. 15. To be more specific, the D flags are provided for respectively corresponding channels, while the EO flags are provided for respectively corresponding time slots. When a fault has occurred in the channel address of its own time slot control unit or instructions to interrupt the channel have been given from said microprocessor unit 1-1 or instructions to render the channel disable have been given from the other time slot control unit, the D flag corresponding to the above channel is set. In other words, the D flag corresponding to the channel in which the fault etc., has occurred is set at "1". As shown in FIG. 22, the channel address table 53-1, 53-2 is composed of memories that store each channel address and the corresponding state of D flag. Time slot control units 3-1, 3-2 further include OR gates 63-1, 63-2 that send channel disable signals ($S_{CHD}$) for sending notice that the channel is disable to the channel address table 53-1, 53-2, respectively. Trouble back signals ($S_{TR}$) for indicating a hardware fault of the own time slot control unit, channel interruption signals ($S_{CHI}$) issued from the microprocessor unit 1-1, and the above-mentioned channel disable signals ($S_{CHD}$) issued from the other time slot control unit are input to OR gates 63-1, 63-2.

Further, the time slot control units 3-1, 3-2 include the fault detector 64-1, 64-2 which detect the occurrence of hardware fault, respectively. Further, they include time slot assignment circuits 65-1, 65-2, which execute the correspondence between the channel address and the time slot number when the instructions for channel assignment (IASS) are issued from the microprocessor unit 1-1. The time slot assignment circuits 64-1, 64-2 are connected to time slot management tables 43-1, 43-2 respectively, and also send the notifying signals ($S_{NT}$) to each other for notifying the other circuit of the current state of use of time slots. Further, time slot sequence signals ($S_{TSS}$) from multiplex lines are input to the time slot assignment circuits 65-1, 65-2 respectively. The channel disable signals output sent the time slot assignment circuits 65-1, 65-2 are seat to the other OR gates, respectively. Further, the time slot control units 3-1, 3-2 include comparators 66-1, 66-2 respectively, each of which compares the presently used channel address in a time slot management table with the channel address in which D flag is set at "1". If it is confirmed that the above two channel addresses are coincident, E flag of the corresponding time slot number in a time slot management table is reset to "0". Here, when the same channel address is assigned to a plurality of time slots, E flags corresponding to these time slots are all reset to "0".

A communication control processor having the above time slot control units 3-1, 3-2 operates in the following sequences.

First, the processor receives a time slot sequence signal that indicates which time slot is presently used, from multiplex lines. If the instructions for channel assignment to the time slot are issued from the microprocessor unit 1-1, time slot assignment circuits 65-1, 65-2 confirm that the indicated channel is not assigned to the same time slot in the other time slot control unit, by the notifying signals ($S_{NT}$).

If the time slot is not used, the indicated channel is assigned to the corresponding time slot. The channel assignment is executed by giving the indicated channel address to the corresponding time slot and sets the corresponding E flag at "1" in time slot management tables 43-1, 43-2. Further, time slot control units 3-1, 3-2 transfer the data of the corresponding channel address by means of the time slot newly indicated. On the other hand, if the time slot is already used, either one of time slot control unit 3-1, 3-2 sends channel disable signals to the other control unit.

When the instructions for channel interruption issued from the microprocessor unit 1-1 have been detected, or instructions from the other time slot control unit to render the channel disable have been received, or a hardware fault has been detected in fault detectors 63-1, 63-2, the signal for notifying the channel address table 53-1, 53-2 of the abnormal state are sent from OR gates 63-1, 63-2 to the above table 53-1, 53-2, respectively. Consequently, the corresponding D flags in the channel address table 53-1, 53-2 are set at "1", respectively.

Finally, the state of the D flags is sent to comparators 66-1, 66-2. If the channel address in which D flag is set and the presently assigned channel address in the time slot management table selected by a time slot sequence are coincident, and if the corresponding E flag is set, the above E flag is reset to "0".

FIG. 23 is another example of time slot management table shown in FIG. 21.

In FIG. 21, one channel address (in this case CH1) is assigned to a plurality of channels, e.g., TS1 and TS2. In this configuration, the amount of data transferred in each channel can easily be increased and a higher data transfer rate can easily be realized.

According to the third preferred embodiment, the state of the use of the channels in a plurality of line control units is managed together by time slot management tables. Further, a sequence of operations for data processing are executed by the microprocessor unit, referring to the above time slot management tables. In other words, exclusive control between different time slot control units is executed by communication control programs of a microprocessor unit, i.e., by software, different from the embodiments mentioned before in FIG. 4 to FIG. 19.

We claim:

1. A fault tolerant communication control processor in a time division multiplex data communication system in which data for a plurality of channels are transferred by dividing and multiplexing the data in a plurality of time slots, comprising:
at least one microprocessor unit to execute communication control programs for controlling said time division multiplex data communication system;
sets of line control units, operatively connected to said at least one microprocessor unit, for transmission and reception of channel, the data in the channels which have channel addresses; and
a plurality of time slot control units operatively connected to said at least one microprocessor unit, each of said time slot control units operatively connected to a corresponding set of line control units included in said sets of line control units to assign the data output from each of said line control units in the corresponding set to at least one of the time slots, when available, in dependence upon correspondence information between the channel addresses and the time slots, one of said time slot control units assigning a specified channel to a given time slot in accordance with channel assignment instructions from said at least one microprocessor unit and instructing all other time slot control units to cancel assignment of any channel to the given time slot, thereby enabling any of said line control units to be active and which of said control units are active to be determined by the channel assignment instructions.

2. A communication control processor in a time division multiplex data communication system in which data for a plurality of channels are transferred by dividing and multiplexing the data in a plurality of time slots, comprising:
a plurality of microprocessor units to execute communication control programs for controlling said time division multiplex data communication system;
sets of line control units, each set operatively connected to a corresponding microprocessor unit included in said plurality of microprocessor units, for transmission and reception of the data in the channels which have addresses;
a plurality of time slot control units, each of said time slot control units operatively connected to a corresponding set of line control units included in said sets of line control units and to the corresponding microprocessor unit, to assign the data output from each of said line control units in the corresponding set to at least one of the time slots, when available, in dependence upon correspondence information between the channel addresses and the time slots, one of said time slot control units assigning a specified channel to a given time slot in accordance with channel assignment instructions from the corresponding microprocessor unit and instructing all other time slot control units to cancel assignment of any channel to the given time slot, thereby enabling any of said line control units to be active and which of said control units are active to be determined by the channel assignment instructions;
means for sending the channel assignment instructions to assign the channels to the time slots, from said microprocessor units to respectively corresponding time slot control units;
means for sending intercepting signals giving notice of canceling assignment of the channels to the time slots, from each of said time slot control units to respectively corresponding microprocessor units; and
means for sending exclusive control signals for inhibiting the assignment of the channels to the given time slot, from a first time slot control unit to all other time slot control units.

3. A communication control processor as set forth in claim 2,
- wherein said first time slot control unit assigns a newly indicated channel to the given time slot and further inhibits the other time slot control units from using the given time slot by sending the other time slot control units the exclusive control signals when the given time slot, which is indicated by the channel assignment instructions from the corresponding microprocessor unit, is not presently used, and changes assignment of the given time slot from a presently assigned channel to the newly indicated channel when the given time slot is presently used,
- wherein a second time slot control unit corresponding to the presently assigned channel notifies the corresponding microprocessor unit of a presently assigned channel address corresponding to the presently assigned channel, and
- wherein a third time slot control unit does not assign an instructed channel address to the given time slot, and further notifies the corresponding microprocessor unit of the instructed channel address, when the first time slot control unit has sent the exclusive control signals to the other time slot control units and the given time slot is inhibited by the exclusive signal when the instructed channel address is determined by the third control unit.

4. A communication control processor as set forth in claim 2, further comprising means for providing priority levels to said time slot control units respectively, a highest priority time slot control unit assigning the specified channel to the given time slot, and the other time slot control units notifying the respectively corresponding microprocessor units of the channel addresses corresponding to the channels that cannot be assigned when the given time slot is indicated simultaneously by different channel assignment instructions from more than one of said microprocessor units.

5. A communication control processor as set forth in claim 4, wherein said means for providing the priority levels comprise master/slave circuits that discern the priority levels of said time slot control units in accordance with master/slave signals indicating each of the priority levels issued from the respectively corresponding microprocessor units.

6. A communication control processor as set forth in claim 5, wherein each of said master/slave circuits includes logical circuits that process the master/slave signals from the respectively corresponding microprocessor units and all other master/slave circuits.

7. A communication control processor in a time division multiplex data communication system in which data for a plurality of channels are transferred by dividing and multiplexing the data in a plurality of time slots, comprising:
- a plurality of microprocessor units to execute communication control programs for controlling said time division multiplex data communication system by issuing channel assignment instructions;
- sets of line control units, operatively connected to respectively corresponding microprocessor units, for transmission and reception of the data in the channels which have channel addresses; and
- a plurality of time slot control units, operatively connected to respectively corresponding sets of said line control units and to the respectively corresponding microprocessor units thereof, to assign the data output from said line control units in the respectively corresponding sets to at least one of the time slots, when available, in dependence upon correspondence information between the channel addresses and the time slots, one of said time slot control units assigning a specified channel to a given time slot in accordance with one of the channel assignment instructions and instructing all other time slot control units to cancel assignment of any channel to the given time slot, thereby enabling any of said line control units to be active and which of said control units are active to be determined by the channel assignment instructions, said time slot control units including
  - time slot assignment circuits, connected to the respectively corresponding microprocessor units and each connected to all other time slot assignment circuits, each time slot assignment circuit including
    - a time slot assignment counter to count bits of data for each time slot in a frame of data,
    - a time slot assignment/cancellation circuit, operatively connected to said time slot assignment counter and one of said microprocessor units, to execute the channel assignment instructions, and
    - a time slot table control unit operatively connected to said time slot assignment counter,
  - time slot tables, operatively connected to said time slot assignment counter, said time slot assignment/cancellation circuit and said time slot table control unit, having memories that establish correspondence between flags indicating whether each time slot is presently used and the channel addresses under control of said time slot table control unit, and
  - a selecting circuit connected to said line control units and said time slot table.

8. A communication control processor as set forth in claim 7, wherein said selecting circuit selects the channels for use by said line control units, in accordance with contents of said time slot table.

9. A communication control processor, as set forth in claim 7, wherein said time slot tables are random access memories.

10. A communication control processor, as set forth in claim 7, wherein said time slot tables have additional memories that establish correspondence between other flags indicating whether channel assignment/cancellation instructions are received.

11. A communication control processor as set forth in claim 7, wherein said time slot assignment/cancellation circuit includes
- instruction registers that temporarily store channel assignment/cancellation instructions, and
- sets of comparators and groups of gate circuits for deciding whether the channel assignment/cancellation instructions are to be executed.

12. A communication control processor as set forth in claim 7, wherein said time slot table control unit includes a set of flip flops for writing new information in said time slot table in accordance with output signals from said time slot assignment counter.

13. A communication control processor in a time division multiplex data communication system in which data for a plurality of channels are transferred by dividing and multiplexing the data in a plurality of time slots, comprising:
- a plurality of microprocessor units to execute communication control programs for controlling said time division multiplex data communication system;

sets of line control units, each set operatively connected to a corresponding microprocessor unit included in said plurality of microprocessor units, for transmission and reception of the data in the channels which have addresses;

a plurality of time slot control units, each of said time slot control units operatively connected to a corresponding set of lien control units included in said sets of line control units and to the corresponding microprocessor unit, to assign the data output from each of said line control units in the corresponding set to at least one of the time slots, when available, in dependence upon correspondence information between the channel addresses nd the time slots, one of said time slot control units assigning a specified channel to a given time slot in accordance with channel assignment instructions from the corresponding microprocessor unit and instructing all other time slot control units to cancel assignment of any channel to the given time slot, thereby enabling any of said line control units to be active and which of said control units are active to be determined by the channel assignment instructions, each of said time slot control units including means for sending exclusive control signals for executing exclusive control from the one of said time slot control units to the other time slot control units; and interrupting circuits, operatively connected to said time slot control units, to prevent the exclusive control signals from being transferred to the other time slot control units, under control of said time slot control units.

14. A communication control processor as set forth in claim 13, wherein said time slot control units include means for controlling said interrupting circuits so that exclusive control is executed when the time division multiplex data communication system is in a multiplexing mode, and the exclusive control signals when the time division multiplex data communication system is in a non-multiplexing mode.

15. A communication control processor as set forth in claim 13, wherein said time slot control units include respectively corresponding display units that indicate whether a multiplexing mode or a non-multiplexing mode is presently selected.

16. A communication control processor as set forth in claim 13, wherein said interrupting circuits are tri-state buffers, which are in an active state when a multiplexing mode is selected, and which are in a cut-off state when a non-multiplexing mode is selected, and wherein said time slot control units determine which of the active state and the cut off state said tri-state buffers are in.

17. A communication control processor in a time division multiplex data communication system in which data for a plurality of channels are transferred by dividing and multiplexing the data in a plurality of time slots, comprising:

a plurality of microprocessor units to execute communication control programs for controlling said time division multiplex data communication system;

sets of line control units, each set operatively connected to a corresponding microprocessor unit included in said plurality of microprocessor units for transmission and reception of the data in the channels which have addresses;

a plurality of time slot control units, each of said time slot control units operatively connected to a corresponding set of line control units included in said sets of line control units and to the corresponding microprocessor unit, to assign the data output from each of said line control units in the corresponding set to at least one of the time slots, when available, in dependence upon correspondence information between the channel addresses and the time slots, one of said time slot control units assigning a specified channel to a given time slot in accordance with channel assignment instructions from the corresponding microprocessor unit and instructing all other time slot control units to cancel assignment of any channel to the given time slot, thereby enabling any of said line control units to be active and which of said control units are active to be determined by the channel assignment instructions, each of said time slot control units including a time slot management table to define correspondence between the channels and the time slots and having flags indicating whether each time slot is presently used, the corresponding microprocessor unit disabling a corresponding flag in said time slot management table when a fault has occurred in a detected channel address of the corresponding time slot control unit and when an instruction to interrupt the detected channel address has been received from one of the corresponding microprocessor unit and the other time slot control units.

18. A communication control processor as set forth in claim 17, wherein the corresponding microprocessor unit assigns one channel address to a plurality of time slots, in said time slot management table.

19. A communication control processor as set forth in claim 17, wherein said time slot control units further include fault detectors that detect occurrence of a hardware fault.

* * * * *

UNITED STATES PATENT AND TRADEMARK OFFICE
CERTIFICATE OF CORRECTION

PATENT NO. : 5,303,230
DATED : April 12, 1994
INVENTOR(S) : Hishida et al.

It is certified that error appears in the above-identified patent and that said Letters Patent is hereby corrected as shown below:

Col. 1, line 6, "Filed" should be --Field--.

Col. 3, line 60, "74" (second occurrence) should be --74'--.

Col. 4, line 51, "channel" should be --channels--.

Col. 5, line 41, delete "undermentioned".

Col. 14, line 59, "seat" should be --sent--.

Col. 16, line 3, delete "channel,".

Col. 19, line 10, "lien" should be --line--.

Signed and Sealed this

First Day of November, 1994

Attest:

BRUCE LEHMAN

Attesting Officer

Commissioner of Patents and Trademarks